United States Patent
Hsin et al.

(10) Patent No.: US 6,741,417 B2
(45) Date of Patent: May 25, 2004

(54) PLANT VARIATION COMPENSATION FOR PIEZOELECTRIC MICROACTUATOR IN DUAL-STAGE SERVO OF DISC DRIVES

(75) Inventors: Yi-Ping Hsin, Burnsville, MN (US); John C. Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 406 days.

(21) Appl. No.: 09/827,821

(22) Filed: Apr. 6, 2001

(65) Prior Publication Data

US 2002/0176201 A1 Nov. 28, 2002

Related U.S. Application Data

(60) Provisional application No. 60/229,567, filed on Aug. 30, 2000.

(51) Int. Cl.[7] .................................................. G11B 5/596
(52) U.S. Cl. ................................ 360/78.05; 360/78.09; 360/78.12
(58) Field of Search .......................... 360/78.05, 75, 360/78.12, 78.09; 369/44.11; 318/432

(56) References Cited

U.S. PATENT DOCUMENTS

| | | | |
|---|---|---|---|
| 5,404,418 A | * | 4/1995 | Nagano ........................ 388/806 |
| 5,452,275 A | * | 9/1995 | Ogawa ....................... 369/44.11 |
| 5,548,192 A | * | 8/1996 | Hanks ........................... 318/560 |
| 5,745,319 A | * | 4/1998 | Takekado et al. .......... 360/78.05 |
| 6,160,676 A | * | 12/2000 | Takaishi .................... 360/78.05 |
| 6,493,172 B1 | * | 12/2002 | Morris et al. ............. 360/77.02 |

* cited by examiner

Primary Examiner—David Hudspeth
Assistant Examiner—K. Wong
(74) Attorney, Agent, or Firm—David K. Lucente; Derek J. Berger

(57) ABSTRACT

A method and system for providing plant variation compensation for a microactuator in a dual-stage servomechanism of a disc drive. The method includes performing indirect adaptive filtering to identify plant variation in the microactuator, and tuning a compensator for the microactuator based on the plant variation. The indirect adaptive filtering can be performed using a two-stage process, including a first stage of adaptive modeling for the dual-stage servomechanism and a second stage of generating an indirect mode-reference inverse for the microactuator. A combined process can alternatively be employed. The microactuator can be a piezoelectric microactuator which forms a PZT system. The dual-stage servomechanism also includes a coarse actuator such as a voice coil motor.

20 Claims, 19 Drawing Sheets

PLANT VARIATION COMPENSATION FOR PIEZOELECTRIC MICROACTUATOR IN DUAL-STAGE SERVO OF DISC DRIVES

RELATED APPLICATIONS

This application claims the benefit of U.S. Provisional Application Serial No. 60/229,567, filed on Aug. 30, 2000 under 35 U.S.C. §119(e).

FIELD OF THE INVENTION

The present invention relates to the field of disc drives having dual-stage actuators including a coarse actuator and a microactuator. More particularly, the present invention relates to methods and systems for providing plant variation compensation for a piezoelectric microactuator in a dual-stage servo of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so the data can be successfully written to and retrieved from the disc surface. A microprocessor controls most of the operations of the disc drive as well as passing the data back to the requesting computer and accepting data from a requesting computer for storing to the disc.

The transducer head is typically placed on a small ceramic block, referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the transducer head away from the disc. At the same time, the air rushing past the cavity or depression in the ABS produces a negative pressure area. The negative pressure or suction counteracts the pressure produced at the rails. The slider is also attached to a load spring which produces a force on the slider that is directed toward the disc surface. The various forces equilibrate so that the slider flies over the surface of the disc at a particular desired fly height. The fly height is the distance between the disc surface and the transducing head, which is typically equal to the thickness of the air lubrication film. This film eliminates the friction and the resulting wear that would occur if the transducing head and the disc were to be in mechanical contact during the disc rotation. In some disc drives, the slider passes through a layer of lubricant rather than flying over the surface of the disc.

Information representative of data is stored on the surface of the storage disc. Disc drive systems read and write information stored on tracks on the storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto the track by writing information representative of data onto the storage disc. Similarly, reading data from a storage disc is accomplished by positioning the read/write head above a target track and reading the stored material on the storage disc. To write to or read from different tracks, the read/write head is moved radially across the tracks to a selected target track. The data is divided or grouped together on the tracks. Some disc drives have a multiplicity of concentric circular tracks. In other disc drives, a continuous spiral is one track on one side of drive. Servo feedback information is used to accurately locate the transducer head. The actuator assembly is moved to the required position and held very accurately during read or write operations using the servo information.

The actuator is rotatably attached to a shaft via a bearing cartridge which generally includes one or more sets of ball bearings. The shaft is attached to the base of the disc drive, and may also be attached to the top cover of the disc drive. A yoke is attached to the actuator. A voice coil is attached to the yoke at one end of the rotary actuator. The voice coil is part of a voice coil motor (VCM) used to rotate the actuator and the attached transducer(s). A permanent magnet is attached to the base and to the cover of the disc drive. The VCM which drives the rotary actuator comprises the voice coil and the permanent magnet. The voice coil is attached to the rotary actuator and the permanent magnet is fixed on the base. The yoke is generally used to attach the permanent magnet to the base and to direct the flux of the permanent magnet. Since the voice coil sandwiched between the magnet and the yoke assembly is subjected to magnetic fields, electricity can be applied to the voice coil to drive the voice coil so as to position the transducer(s) at a target track.

Two of the ever constant goals of disc drive designers are to increase the data storage capacity of disc drives, and to decrease the amount of time needed to access the data. To increase storage capacity, current disc drives have increased numbers of tracks per inch (TPI). Put simply, current disc drives squeeze more tracks onto the same size disc. Decreasing the amount of time needed to access the data can be thought of as increasing the speed at which data is retrieved. Increasing the speed at which data is retrieved is very desirable. Any decreases in access time increase the speed at which a computer can perform operations on data. When a computer system is commanded to perform an operation on data that must be retrieved from disc, the time needed to retrieve the data from the disc is often the bottleneck in the operation. When data is accessed from a disc more quickly, more transactions can generally be handled by the computer in a particular unit of time.

A rotating disc data storage device uses a servo system to perform two basic operations: track seeking and track following. Track seeking refers to the ability of the disc drive and the servo system to move the read/write transducer head of the disc drive from an initial track to a target track from which data is to be read, or to which data is to be written. The settling of the transducer head at the target track is referred to as seek settling. Track following, which is performed after the head has been aligned with a target track, refers to the ability of the disc drive and the servo system to maintain the read/write head positioned over the target track. Note that, to effectively perform track seeking and track following in a disc drive with increased TPI, the servo open loop bandwidth of the system must also be pushed or increased.

As the areal density of magnetic disk drives continues to increase, more accurate positioning of the read/write head will be needed. It is expected that track density will achieve or exceed 30,000 TPI by the year 2000. At such high density, a servo bandwidth as high as 1,500 to 2,000 Hz is required to suppress high frequency disturbances. Because the servo bandwidth of single-stage, VCM actuators is far below that value, the use of dual-stage actuators for high-bandwidth, high-accuracy positioning has been introduced. In dual-actuator disc drives, a VCM is used as a first-stage actuator to generate a coarse but large displacement, and a microactuator is used as a second-stage actuator to provide fine and fast positioning. In some dual-actuator disc drives, the second-stage actuator is a piezoelectric microactuator that is mounted on an E-block, and uses piezoelectric elements made of a lead-zirconate-titanate material. Such a microactuator system can be referred to as a PZT system. The first-stage and second-stage actuators are controlled by a dual-stage controller.

Ideally, the PZT system of a dual-actuator disc drive will maintain a constant gain at the frequency range of less than about 2,500 Hz with small plant variations, and will have a sway mode that occurs around 7,000 Hz. In practice, however, the resonance control in the mechanical structure of such a PZT system is not robust. In FIG. 1, for example, a graph 100 shows a comparison between frequency response of the ideal PZT model and a typical measured frequency response of an actual PZT system. The frequency response of the actual PZT system includes gain variations and unwanted resonance modes that appear below the frequency of the sway mode. Such gain and frequency variations degrade the performance of the disc drive and, in some cases, cause stability problems. To handle the gain variations and unwanted resonance modes, a conservative controller design with a large uncertainty bound could be used for controlling such PZT systems. Using a conservative controller design, however, requires a tradeoff in terms of sacrificed system performance. A less conservative dual-stage controller design may also be used. However, such a dual-stage controller design requires accurate system identification, and skilled manual tuning, in order to maintain stability and performance for each specific PZT system. Unfortunately, providing accurate system identification, and skilled manual tuning, is particularly tricky and burdensome to achieve in factory environments.

Therefore, an improved method and apparatus for controlling dual-actuator disc drives is needed. There is also a need for a method and apparatus for handling the gain variations and resonance modes that appear in the frequency response of the PZT systems of dual-actuator disc drives. Further, there is a need for a method and apparatus for controlling dual-actuator disc drives without resorting to conservative controller designs with large uncertainty bounds that result in the sacrifice of system performance, and which applies to all dual-actuator disc drives without performance degradation. There is a need for methods to automatically perform accurate system identification of dual-actuator disc drives, and to automatically tune their control, which can be easily and effectively applied even in automated factory environments.

SUMMARY OF THE INVENTION

In accordance with one exemplary embodiment of the present invention, a method of providing plant variation compensation for a microactuator in a dual-stage servomechanism of a disc drive includes the steps of performing indirect adaptive filtering to identify plant variation in the microactuator, and tuning a compensator for the microactuator based on the plant variation.

In one embodiment of this method, indirect adaptive filtering is performed using a two-stage process, including a first stage of adaptive modeling for the dual-stage servomechanism and a second stage of generating an indirect model-reference inverse for the microactuator. In another embodiment of this method, the indirect adaptive filtering is performed using a combined process which includes adaptive modeling for the dual-stage servomechanism, and simultaneously generating an indirect model-reference inverse for the microactuator. The indirect model-reference inverse generated by either embodiment can be used as the compensator. The compensator for the microactuator can be implemented as a finite impulse response (FIR) filter. Alternatively, the FIR filter can first be converted into an infinite impulse response (IIR) filter using linear model fitting. In one embodiment, the microactuator is a piezoelectric micro actuator including a piezoelectric element made of a lead-zirconate-titanate material to form a PZT system, and the dual-stage servomechanism includes a coarse actuator such as a voice coil motor (VCM).

In accordance with another embodiment of the present invention, a dual-actuator disc drive includes a base, a disc rotatably attached to the base, a transducer carried in a transducing relation with respect to the disc, a first-stage actuator for providing coarse positioning of the transducer, a second-stage actuator for providing fine positioning of the transducer, and a controller. The controller is coupled to the first-stage and second-stage actuators, and is for monitoring an actual position signal for the transducer and for generating a first and a second control signal for the first-stage and the second-stage actuator, respectively. The controller includes a first and a second control path for the first-stage and second-stage actuator, respectively. The second control path includes a compensator for approximating an ideal second-stage actuator. In one embodiment of this disc drive, the first-stage actuator includes a VCM, and the second-stage actuator includes a PZT system. In alternative embodiments, the compensator includes either an FIR filter or an IIR filter that is based on an indirect model-reference inverse for the second-stage actuator.

In accordance with another embodiment of the invention, a system for providing plant variation compensation for a piezoelectric microactuator in a dual-stage servomechanism of a disc drive includes performing means and tuning means. The performing means is for performing indirect adaptive filtering to identify plant variation in the piezoelectric microactuator. The tuning means is for tuning a compensator for the piezoelectric microactuator based on the plant variation.

These and various other features as well as advantages which characterize the present invention will be apparent to a person of ordinary skill in the art upon reading the following detailed description and reviewing the associated drawings.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and that structural changes may be made without departing from the scope of the invention.

In this application, systems for automatic plant modeling and compensator tuning which use indirect adaptive filtering for dual-stage servos in disc drives are described. The systems circumvent the limitation that traditional adaptive filtering is only applicable to open-loop systems. Both a two-stage indirect adaptive filtering system and a combined indirect adaptive filtering system are disclosed. Based upon only a position measurement, these adaptive systems can identify plant variations in a piezoelectric microactuator (a PZT system), and obtain a model-reference inverse under the existence of plant disturbance. In one embodiment, by using linear model fitting methods, a solved finite impulse response (FIR) inverse can be converted into an infinite impulse response (IIR) filter for the purpose of weeding out the model misadjustment from disturbances. The IIR inverse solution can then be incorporated into the control system of the disc drives as a PZT compensator for approximating an ideal PZT system. A universal controller based on the ideal PZT system model can be implemented into dual-stage disk drives without performance degradation.

Figure 1:
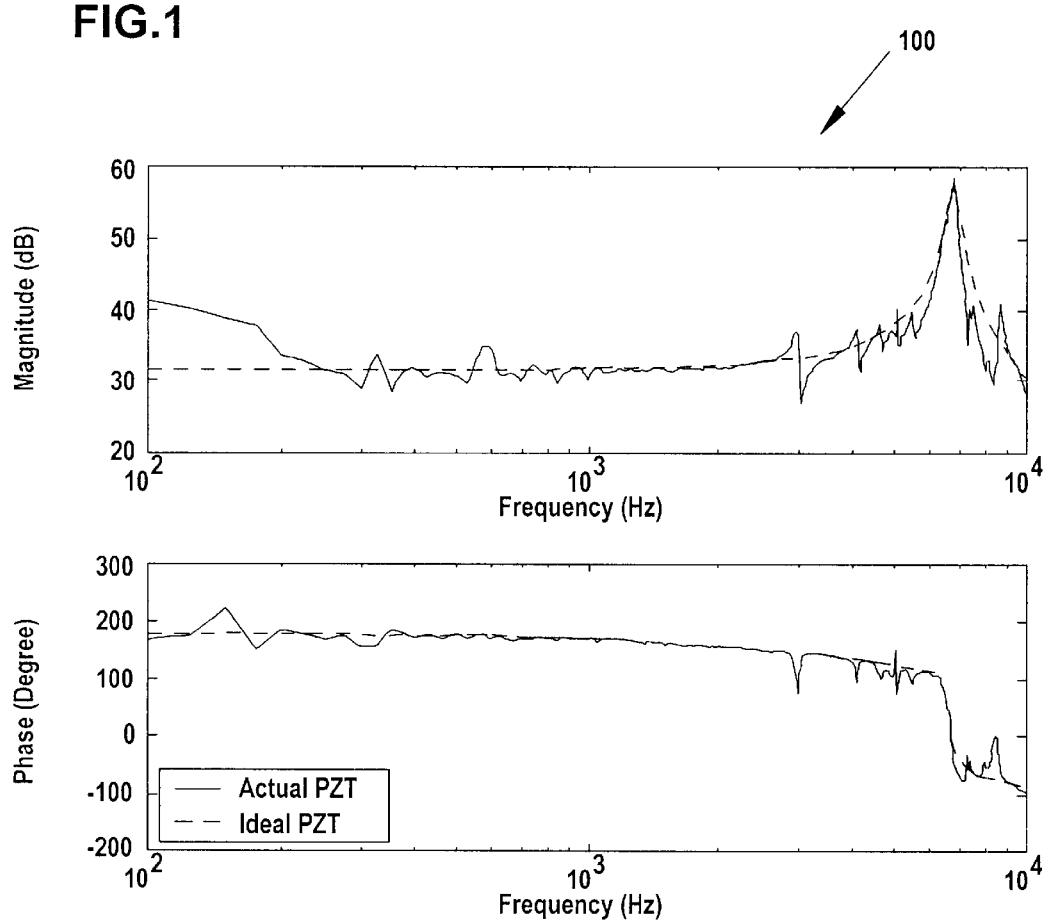
FIG. 1 are graphs illustrating frequency response of the ideal PZT model and an actual PZT system.
Figure 2:
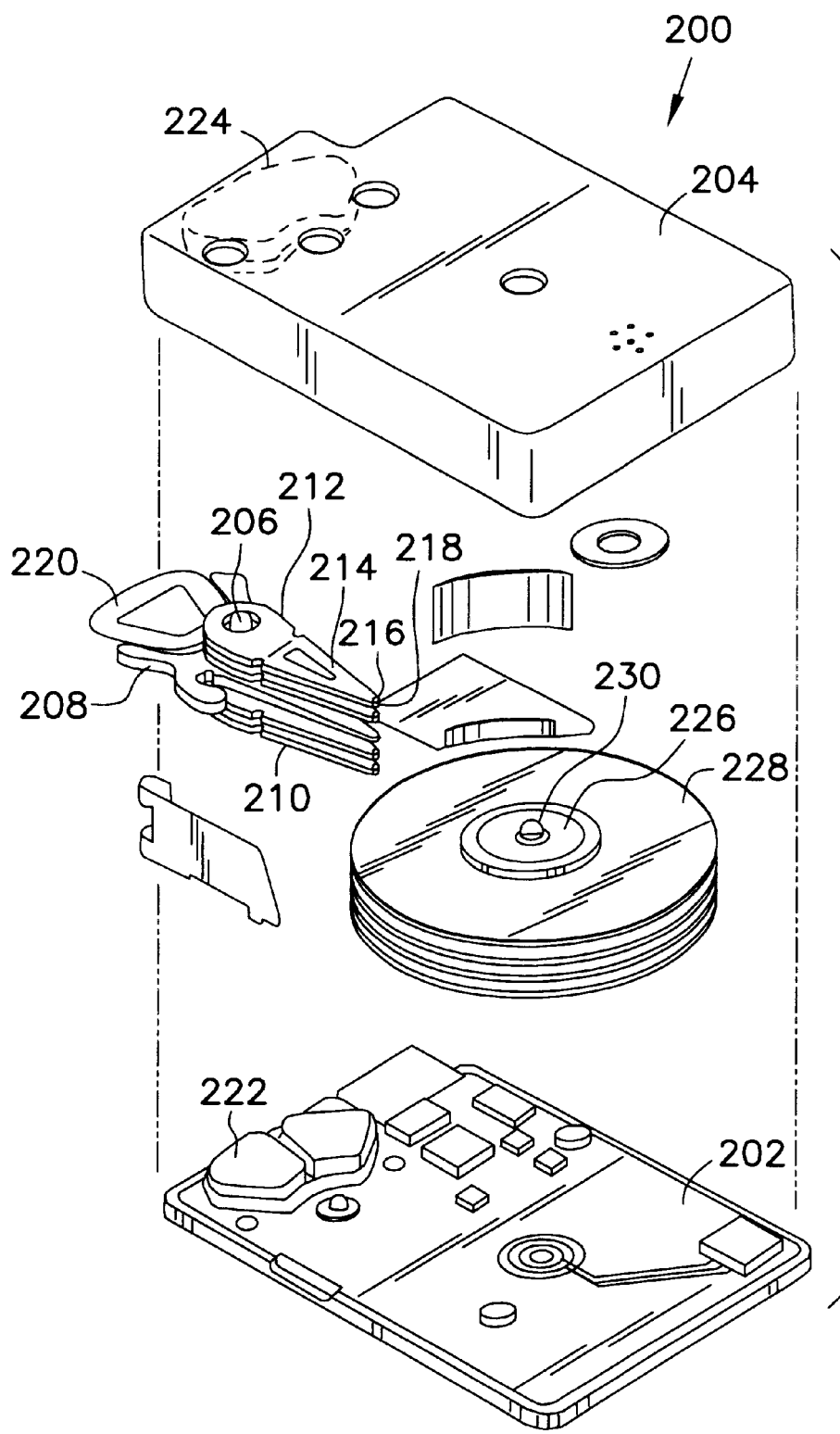
FIG. 2 is an exploded view of a disc drive with a multiple disc stack and a dual-stage actuator system in accordance with one embodiment of the invention.

Referring now to FIG. 2, a disc drive 200 having a rotary actuator includes a housing having a base 202 and a cover 204 which form a disc enclosure. Rotatably attached to base 202 on an actuator shaft 206 is a rotary actuator assembly 208. The rotary actuator assembly 208 includes a comb-like structure 210 having a plurality of arms 212. Attached to separate arms 212 on comb 210 are load beams or springs 214, which are also referred to as suspensions. Attached at the end of each load beam or spring 214 is a slider 216 which carries a magnetic transducer 218. Slider 216 and transducer 218 form what is often referred to as a read/write head. It should be noted that many sliders have one transducer 218 and that is what is shown in the figures. It should also be noted that the present system is equally applicable to sliders having more than one transducer, such as what is referred to as a magneto-resistive (MR) head in which one transducer is generally used for reading and another transducer is generally used for writing. On the end of rotary actuator assembly 208 opposite load springs 214 and sliders 216 is a voice coil 220.

Attached within the disc enclosure between base 202 and cover 204 is a first magnet 222 and a second magnet 224. As shown, first and second magnets 222 and 224 are associated with base 202 and cover 204, respectively. First magnet 222, second magnet 224 and voice coil 220 are the key components of a voice coil motor (VCM) that applies a force to actuator assembly 208 to rotate actuator assembly 208 about actuator shaft 206. Also mounted to base 202 is a spindle motor. The spindle motor includes a rotating portion called a spindle hub 226. In this particular disc drive, the spindle motor is located within spindle hub 226. In FIG. 2, a number of discs 228 are shown as attached to spindle hub 226. In other disc drives, a single disc or a different number of discs from that shown in FIG. 2 may be attached to the hub. The system described herein applies equally to disc drives having a plurality of discs and to disc drives having a single disc, and is also equally applicable to disc drives with spindle motors which are within hub 226 or under hub 226. Discs 228 are rotatably attached to base 202 through a shaft 230 (and by hub 226). Actuator assembly 208 carries transducer 218 in a transducing relation with respect to one of discs 228 for reading and writing data to that disc 228 during operation of drive 200.

Figure 3:
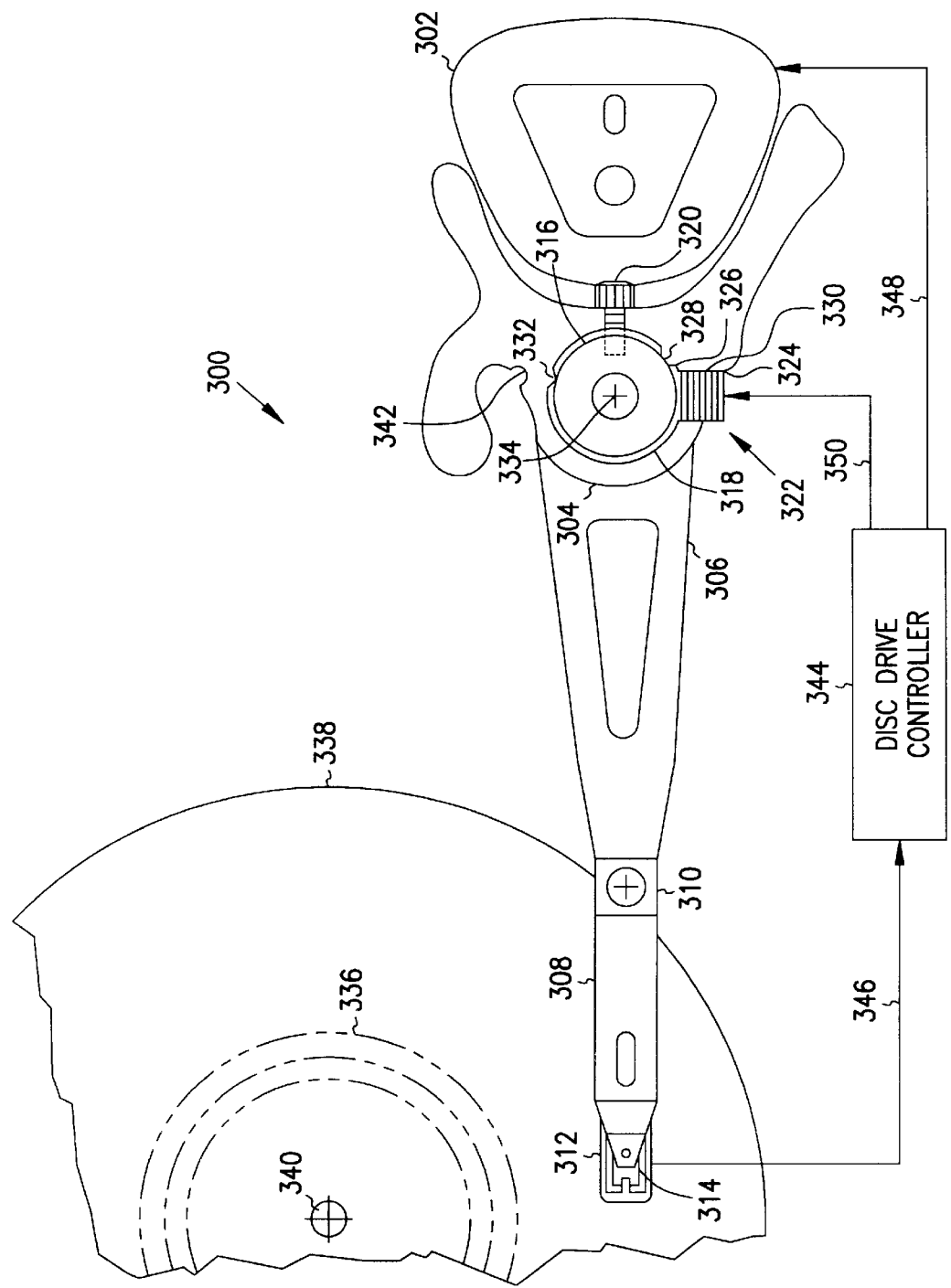
FIG. 3 is a plan view of the dual-stage actuator system of FIG. 2, which includes a coarse actuator (e.g., a voice coil motor), and a microactuator (e.g., a piezoelectric actuator including piezoelectric elements made of a lead-zirconate-titanate material to form a PZT system), and a simplified schematic block diagram of a dual-stage servo system for controlling the coarse actuator and microactuator.

The VCM including voice coil 220, first magnet 222 and second magnet 224 is selectively operated to move actuator arms 212 around an axis defined by actuator shaft 206. The VCM operates to move slider 216 and transducer 218 between tracks defined on disc 228. However, because disc drive 200 supports high track density, the VCM lacks sufficient resolution and frequency response to position transducer 218 precisely over a selected track on disc 228. To provide sufficient resolution and frequency response to support high-track density, a high-resolution actuator referred to as a microactuator is also provided, as shown in FIG. 3. Thus, disc drive 200 has a dual-stage actuator system to support high track density, with the VCM actuator providing a first, coarse stage, and the microactuator providing a second, fine stage.

An exemplary dual-stage actuator system 300 for disc drive 200 according to one embodiment of the present invention is illustrated in FIG. 3. Actuator system 300 includes a VCM 302 (only the voice coil is shown), an E-block body 304, an actuator arm 306 that extends from E-block body 304, a load beam 308 connected to actuator arm 306 at a head mounting block 310, and a gimbal 312 connected at an end of load beam 308 to support a slider 314 that, in turn, carries a transducing head. A pivot cartridge 316 is provided in a cavity 318 in E-block body 304, and is rigidly fastened to body 304 at one end, such as by one or more screws 320. A piezoelectric element 322, which is provided in E-block body 304, includes terminals 324 and 326. E-block body 304 is supported at three points to pivot cartridge 316, including at fastener 320 along the longitudinal axis of E-block body 304, at a point 328 adjacent to proximal end 330 of piezoelectric element 322, and at a hinge point 332. In this embodiment, piezoelectric element 322 is made of a lead-zirconate-titanate material, and thus forms a microactuator that is part of a PZT microactuator system.

VCM 302 is operated to rotate E-block body 304 and pivot cartridge 316 around axis 334. This rotation coarsely positions slider 314, and also the transducer, over selected tracks 336 of disc 338 as disc 338 is rotated about axis 340. For more precise movements, piezoelectric element 322 is selectively expanded or contracted by applying a voltage to terminals 324 and 326. This voltage causes distortion of E-block body 304 which, in turn, alters the position of slider 314 with respect to tracks 336 of disc 338. In one embodiment, a relief 342 is formed in E-block body 304 adjacent to hinge point 332 to facilitate distortion of E-block body 304 in response to expansion or contraction of piezoelectric element 322. In another embodiment, a portion of E-block body 304 located near hinge point 332 is composed of compliant material to facilitate distortion. Control of VCM 302 and piezoelectric element 322 is provided by a disc drive controller 344, which receives position feedback signals from the transducer via lines 346, and provides output control signals to VCM 302 and to piezoelectric element 322 via lines 348 and 350, respectively, as is described below. System 300, except for disc drive controller 344, is further described in U.S. Pat. No. 6,025,975, which is also owned by the assignee of the present application.

In the exemplary embodiment of FIG. 3, the dual-stage actuator system 300 provides high-bandwidth, high-accuracy positioning. VCM 302 operates as a first-stage actuator that provides coarse but large displacement, and piezoelectric element 322 operates as a second-stage microactuator that provides fine and fast positioning. System 300 is, however, just one embodiment of a dual-stage actuator system with which the present invention can be used. Other dual-stage actuator systems having other first-stage coarse actuators and/or second-stage fine actuators can also be used. In the embodiment of FIG. 3, the second-stage actuator is a piezoelectric actuator mounted on E-block body 304. In another embodiment, the second-stage actuator is a piezoelectric actuator located at head mounting block 310 which rotates load beam 308 relative to actuator arm 306 in response to an applied voltage. In yet another embodiment, the second-stage actuator is a piezoelectric actuator formed on slider 314 which rotates the transducer in response to an applied voltage. Other examples of dual-stage disc drive actuator systems are described in U.S. Pat. Nos. 5,898,541, 6,101,058, 6,157,522, and 6,163,434, each of which is owned by the assignee of this application. The present invention may be used with any of these systems, and with other dual-stage actuator systems that would be apparent to people of skill in the art.

Figure 4:
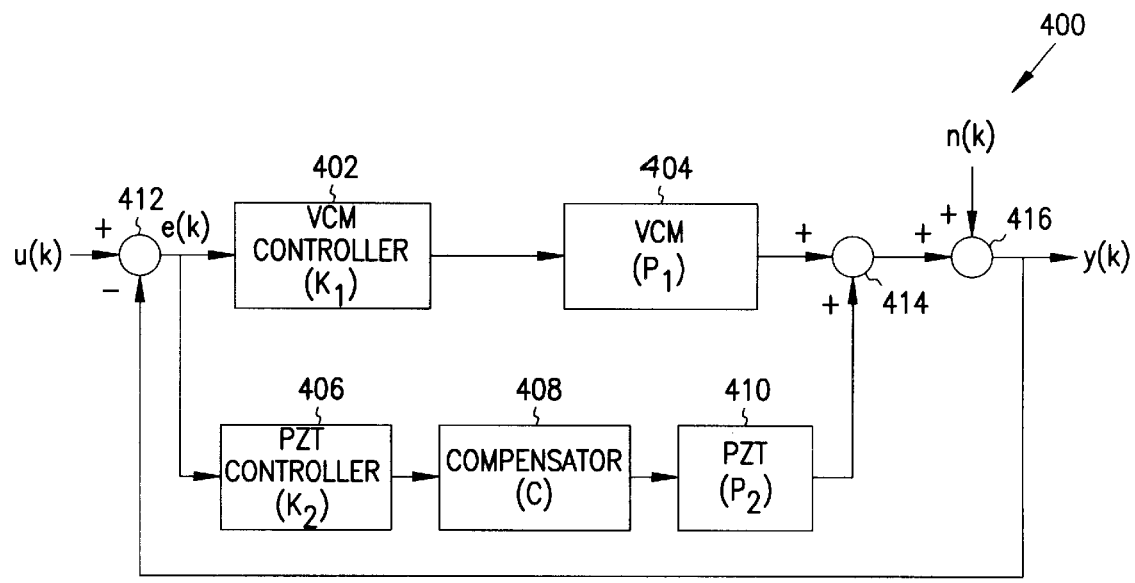
FIG. 4 is a block diagram showing a dual-stage servomechanism for the disc drive of FIG. 2, including a voice coil motor (VCM) control loop and a PZT control loop with a PZT compensator, in accordance with one embodiment of the invention.

Referring to FIG. 4, a dual-stage servomechanism 400 for the disc drive of FIG. 2 is the result of a unified controller design process which has added a discrete-time filter into the PZT control loop as a PZT compensator. FIG. 4 shows dual-stage servomechanism 400 in track-following mode with the additional PZT compensator. Dual-stage servomechanism 400 includes a VCM controller ($K_1$) 402, a VCM system ($P_1$) 404, a PZT controller ($K_2$) 406, a PZT compensator (C) 408, a PZT system ($P_2$) 410, a difference element 412, a first summation element 414, and a second summation element 416. The identified signals include a position reference signal u(k), an actual position measurement y(k), a position error signal (PES) e(k), and the effect of plant disturbance to position measurement, represented by n(k).

Difference element 412 receives position reference signal u(k) and actual position measurement y(k), and generates position error signal (PES) e(k) based on the difference between u(k) and y(k). PES e(k) is provided to VCM controller 402, which generates a VCM control signal which is applied to VCM system 404. PES e(k) is also provided to PZT controller 406, which generates a PZT control signal that is compensated by compensator 408 and then applied to PZT system 410. First summation element 414 sums the outputs of VCM system 404 and PZT system 410, and the output of element 414 is applied to second summation element 416, which adds the effect of plant disturbance to position measurement n(k). The output from element 416 is actual position measurement y(k), which becomes a feedback signal. Thus, FIG. 4 represents the entire dual-stage servomechanism 400 for controlling the position of the transducer in relation to a selected track on a magnetic disc.

Therefore, in FIG. 4, the VCM system and the PZT system are represented by $P_1$ and $P_2$, respectively. The controllers for the two parallel loops of $P_1$ and $P_2$ are represented by $K_1$ and $K_2$, respectively. Note that, even in a modem control design, the multivariable controller can still be assumed to be decoupled into two individual controllers $K_1$ and $K_2$, with one controller being used for each loop. The additional PZT compensator C is located in the PZT loop in cascade with the PZT system $P_2$. The position error signal (PES) e(k) is the difference between position reference signal u(k) and the actual position measurement y(k). The effect of the plant disturbance to the position measurement is represented by n(k). The add-on compensator C is tuned to let the dynamic response of the compensated PZT system approximate to that of the ideal PZT system model. Then, a universal dual-stage controller design based upon the ideal PZT system model can be applied to all disc drives without performance degradation. However, accurate system identification and tuning for compensator C is necessary to approximate the ideal PZT system. Therefore, the development of an automatic tuning process for tuning compensator C is important, especially for use in the factory automation environment.

A purpose of the present system is to provide an automatic plant modeling and compensator tuning scheme using adaptive filtering techniques. The adaptive filter, which includes a tapped delay line with variable coefficients or tap weights, is driven by the least mean square (LMS) algorithm of Widrow and Hoff, described in Bernard Widrow and Eugene Walach, *Adaptive Inverse Control*, Prentice Hall, Inc., 1996. The LMS algorithm is a gradient algorithm based on the method of steepest descent. LMS adaptive filtering can be used for direct adaptive modeling, inverse plant modeling, and model-reference inverses under existence of plant disturbance. The direct model has a transfer function similar to that of the plant being modeled. The inverse model has a transfer function like the reciprocal of the plant transfer function. For model-reference inverses, the cascade of the plant and its model-reference inverse develops an impulse response equal to that of a selected reference model. The model-reference inverse filter then becomes the controller for the plant. The entire system, then, has a dynamic response like that of the reference model.

There are, however, two problems that are encountered in applying the above techniques to the dual-stage control system of FIG. 4. First, the adaptive filtering is only applicable in open-loop systems. The modeling of any component in a closed control loop (in this case, the PZT system) is not acceptable because the feedback loop signal will corrupt the adaptive filtering process. Second, a direct position measurement from the PZT system is not available. The only measurable output is the combined displacement measurement resulting from the VCM and PZT systems.

In order to circumvent these two problems, a two-stage indirect adaptive filtering scheme is used. By changing the location of an injected dither signal at each stage, and by treating the entire system as an open-loop unknown plant with disturbances, the parameters of the PZT compensator can be generated automatically with the appropriate adaptive filtering schemes. The two-stage indirect adaptive filtering scheme described herein provides a method to extend the applications of adaptive filtering to modeling the components in closed-loop systems without the interference of feedback signals. Furthermore, if the system is able to support the injections of two uncorrelerated dither signals at different locations simultaneously, the two-stage adaptive filtering processes can be merged into a combined adaptive filtering scheme which includes three separate adaptive filters that are run together.

Least Mean Square (LMS) Adaptive Filtering

As noted above, the LMS adaptive filter is a tapped delay line with variable coefficients or tap weights which are driven by the LMS algorithm of Widrow and Hoff. The LMS algorithm is a gradient algorithm which is based upon the method of steepest descent. The following paragraphs first describe a direct LMS adaptive modeling scheme. Then, the technique of adaptive model-reference inverses with disturbances is described. After introducing these two schemes, a two-stage indirect adaptive filtering scheme which uses both of these adaptive schemes is described.

Direct LMS Adaptive Modeling

Figure 5:
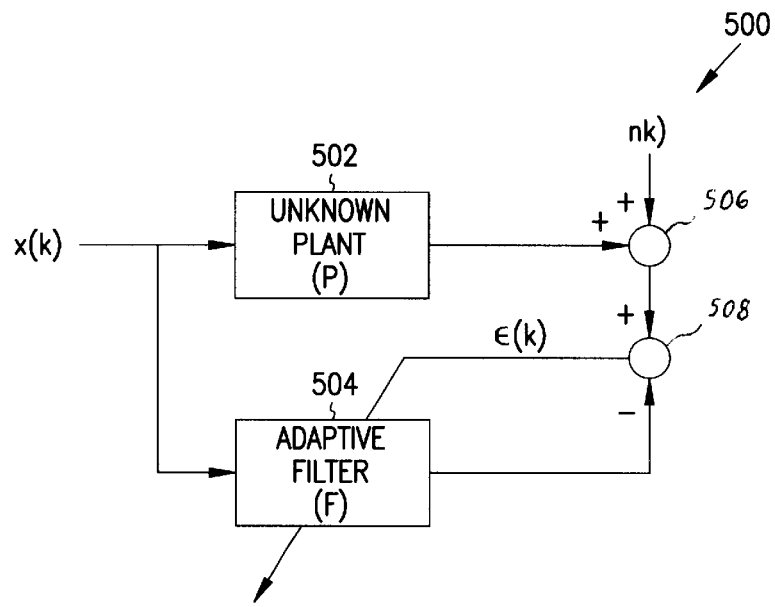
FIG. 5 is a block diagram illustrating the concept of direct least mean square (LMS) adaptive modeling with plant disturbance.

Referring to FIG. 5, the basic concept of adaptive modeling is illustrated by a block diagram 500 of a typical LMS adaptive modeling scheme. The components of block diagram 500 include an unknown plant (P(z)) 502, an adaptive filter (F(z)) 504, a summation element 506, and a difference element 508. The identified signals include an input signal x(k), a modeled error signal ε(k), and plant disturbance n(k). The plant disturbance n(k) is assumed to be uncorrelated with the input signal x(k). The N-tap adaptive finite impulse response (FIR) filter F(z) has the following form:

$$F(k,q^{-1}) = f_0(k) + f_1(k)z^{-1} + \ldots + f_{N-1}(k)z^{-(N-1)} \quad (1)$$

where the parameters $f_i(k)$, or the tap weights, at time k are adjusted on-line via the LMS algorithm. The tap number N should be selected sufficiently large to describe the impulse response of the unknown plant for accurate modeling results. In one embodiment, tap number N is selected as 100. However, N may have other values.

The goal of the adaptive filter F(z) is to use both the input signal x(k) and the modeled error signal ε(k) to adjust the tap weights $f_i(k)$ in order to match the unknown dynamics of the plant P(z) and to cause the modeled error signal ε(k) to be minimized in the mean square sense. The update law of tap weights is given by:

$$f_i(k+1) = f_i(k) + 2\mu \cdot \epsilon(k) \cdot x(k-i); \text{ for } i=0, 1, \ldots, N-1 \quad (2)$$

where $\mu$ is a constant gain which determines the convergence rate and the minimum error level. In order for adaptive filter F(z) to provide a good broadband model of the unknown plant P(z), a zero-mean white dither should be used as the input signal x(k). The injection of such a dither signal will cause the plant to be "persistently exciting". The objective of using such a dither signal is to ensure that all frequency components will be represented in the modeling signal. After the convergence of the parameters of the adaptive model, the transfer function of the adaptive filter F(z) will closely match the transfer function of the unknown plant P(z). In other words:

$$F(z) \approx P(z) \quad (3)$$

LMS Adaptive Model-Reference Plant Inverse with Disturbance

Figure 6:
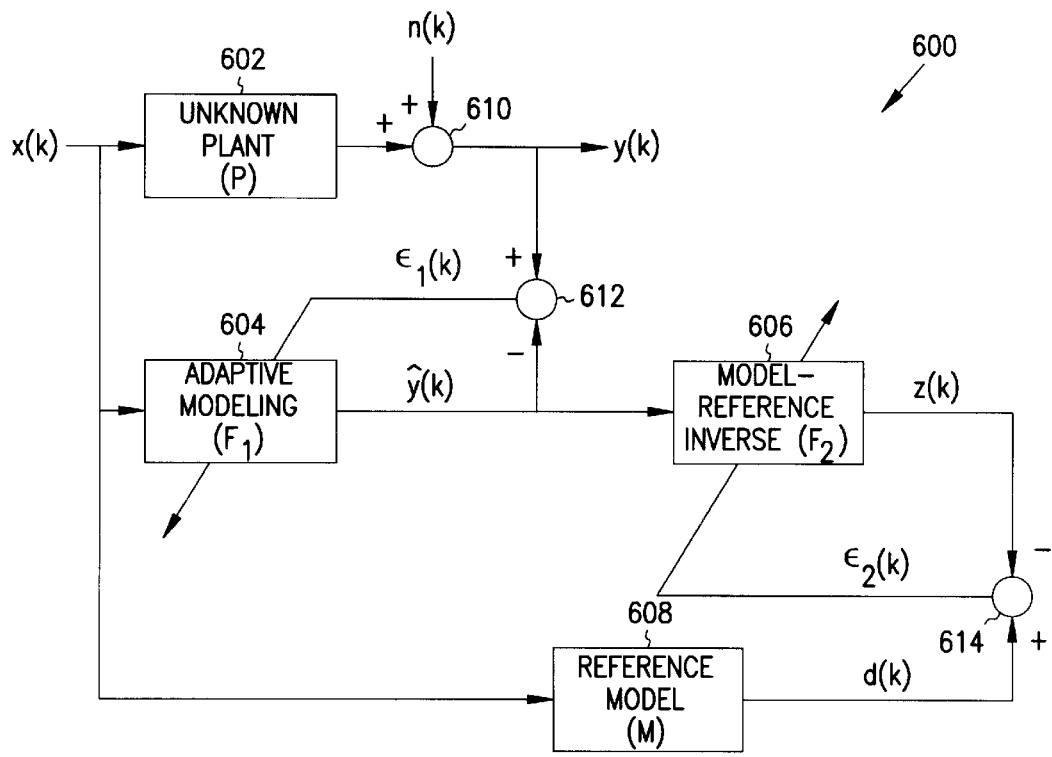
FIG. 6 is a block diagram illustrating the concept of LMS adaptive model-reference plant inverse with plant disturbance.

The model-reference inverse process becomes somewhat complicated when the plant is subject to disturbances. Referring to FIG. 6, the LMS adaptive model-reference plant inverse is illustrated by a block diagram 600. The components of diagram 600 include an unknown plant (P(z)) 602, a first adaptive filter ($F_1$) 604 (also called an adaptive modeling filter), a second adaptive filter ($F_2$) 606 (also called an adaptive model-reference inverse filter), a reference model (M) 608, a summation element 610, a first difference element 612, and a second difference element 614. The identified signals include an input signal x(k), plant disturbance n(k), a contaminated plant output signal y(k), a first modeled error signal $\epsilon_1(k)$, an estimated plant output signal ŷ(k) without effects of disturbances, an actual output signal z(k), a second modeled error signal $\epsilon_2(k)$, and a desired output signal d(k).

The goal of this process is to obtain a model-reference inverse filter $F_2(z)$ that, when used as a compensator to the plant P(z), would result in the entire system whose overall transfer function would closely match the transfer function M(z) of a given reference model. The adaptive filters $F_1(z)$ and $F_2(z)$ have the same form as that shown above for equation (1), with tap numbers $N_1$ and $N_2$, respectively. The purpose of the adaptive modeling filter $F_1(z)$ is to isolate the plant disturbance from the model-reference inverse process in the adaptive filter $F_2(z)$. The function of $F_1(z)$ is to model the unknown plant P(z) and to generate the estimated plant output ŷ(k) without the effect of disturbances. The update law of tap weights of adaptive modeling filter $F_1(z)$ is given by the following equation:

$$f_{1i}(k+1) = f_{1i}(k) + 2\mu_1 \cdot \epsilon_1(k) \cdot x(k-i); \text{ for } i=0, 1, \ldots, N_1-1 \quad (4)$$

where $\epsilon_1(k)$ is the first modeled error signal and $\mu_1$ is a first constant gain.

Instead of directly applying the contaminated plant output y(k), the estimated plant output ŷ(k) is used as the input signal to the adaptive model-reference inverse filter $F_2(z)$. The input signal x(k) is also fed into the reference model M to compute desired output signal d(k). The second modeled error signal $\epsilon_2(k)$ is the difference between the desired output signal d(k) and the actual output signal z(k). Based on the estimated plant output ŷ(k) and the second modeled error signal $\epsilon_2(k)$, the update law of parameters of model reference inverse filter $F_2(z)$ is given by the equation:

$$f_{2i}(k+1) = f_{2i}(k) + 2\mu_2 \cdot \epsilon_2(k) \cdot ŷ(k-i); \text{ for } i=0, 1, \ldots, N_2-1 \quad (5)$$

where $\epsilon_2(k)$ is the second modeled error signal and $\mu_2$ is a second constant gain.

After the convergence of the parameters of adaptive filters $F_1(z)$ and $F_2(z)$, the transfer function of adaptive filter $F_1(z)$ will closely match that of the unknown plant P(z), and the transfer function of $F_1(z)F_2(z)$ will also closely match that of the given reference model M(z), as is indicated by equations (6) and (7), respectively:

$$F_1(z) \cong P(z) \quad (6)$$

$$F_1(z)F_2(z) \cong M(z) \quad (7)$$

Substituting equation (6) into equation (7) results in the following equation (8):

$$P(z)F_2(z) \cong M(z) \quad (8)$$

Adaptive model-reference inverse filter $F_2(z)$ can then be used as a compensator for the plant P(z), which would then result in the whole system having an overall transfer function that would closely match that of the given reference model M(z).

Two-Stage Indirect Adaptive Filtering

The LMS adaptive filtering technique described above will work only under the circumstances that the output signal of the unknown plant does not feed back into the plant again. For circumventing the difficulties associated with the feedback loop, and the unavailable PZT axis position measurement in the dual-stage servo, a two-stage indirect adaptive filtering scheme is employed, as illustrated in FIG. 7.

Figure 7:
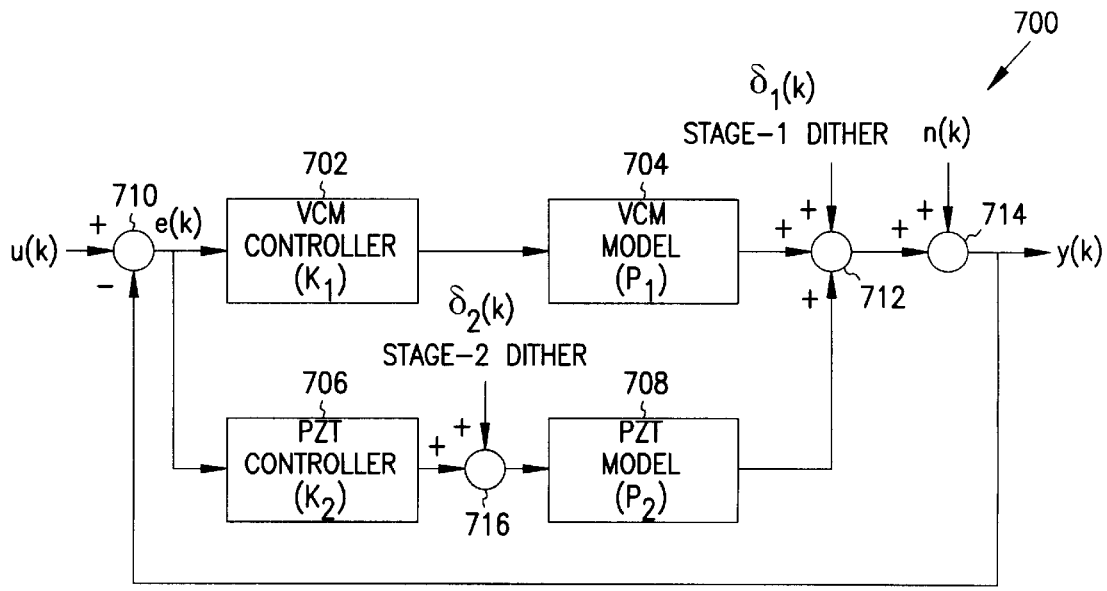
FIG. 7 is a block diagram illustrating a dual-stage servo-mechanism with two injected dither signals, and including a VCM control loop and a PZT control loop.

Referring to FIG. 7, a block diagram 700 of a dual-stage servomechanism is shown, that includes a VCM control loop and a PZT control loop, and two injected dither signals. The components of block diagram 700 include a VCM controller ($K_1$) 702, a VCM model ($P_1$) 704, a PZT controller ($K_2$) 706, a PZT model ($P_2$) 708, a difference element 710, and first, second and third summation elements 712, 714 and 716. The identified signals include a reference position signal u(k), a position error signal (PES) e(k), the plant disturbance effect on position signal n(k), an actual position signal y(k), a stage-1 dither signal $\delta_1(k)$, and a stage-2 dither signal $\delta_2(k)$. The first dither signal $\delta_1(k)$ is an injection to the position measurement used in stage-1 of the two-stage indirect adaptive filtering scheme. The second dither signal $\delta_2(k)$ is a voltage injection to the PZT system used in stage-2 of the two-stage scheme. The plant disturbance n(k) is assumed to be uncorrelated with $\delta_1(k)$ and $\delta_2(k)$. The power of the dither signals should be limited to avoid saturating the PZT system.

In the following discussion, adaptive modeling of sensitivity function with disturbances in stage-1 of the two-stage indirect adaptive filtering scheme is first described. Then, the indirect adaptive scheme used in stage-2 is described, with the model-reference inverse of the PZT system based on the modeling result of stage-1. By changing the location of the injected dither signal at each of the two stages, and by treating the whole system as an open-loop unknown plant with the appropriate adaptive filtering schemes, the parameters of the PZT compensator C (i.e., PZT compensator 408 in FIG. 4) can be generated automatically, which is particularly advantageous for use in tuning the compensator in automated factory environments. The two-stage indirect adaptive filtering scheme can also be merged into a single, combined indirect adaptive filtering scheme with three adaptive filters running together. The prerequisite for the use of the combined scheme is that the system be able to support the injections of the two uncorrelated dither signals $\delta_1(k)$ and $\delta_2(k)$ simultaneously. A description of the combined adaptive scheme is also presented.

Stage-1: Adaptive Modeling of Dual-Stage Servo

Stage-1 of the two-stage indirect adaptive modeling scheme is the adaptive modeling for the dual-stage servomechanism. The reference input u(k) and second dither signal $\delta_2(k)$ are both set to zero during the stage-1 process. By using the first dither signal $\delta_1(k)$, which provides a zero-mean white dither signal, at the position measurement as the input signal, the transfer function between the first dither signal $\delta_1(k)$ and the position measurement y(k) can be derived from block diagram 700 as:

$$\frac{Y(z)}{\Delta_1(z)} = \frac{1}{1 + K_1 P_1 + K_2 P_2} \quad (9)$$

Note that the transfer function which is indicated by equation (9) would be the equivalent open-loop plant in the stage-1 adaptive modeling scheme.

Figure 8:
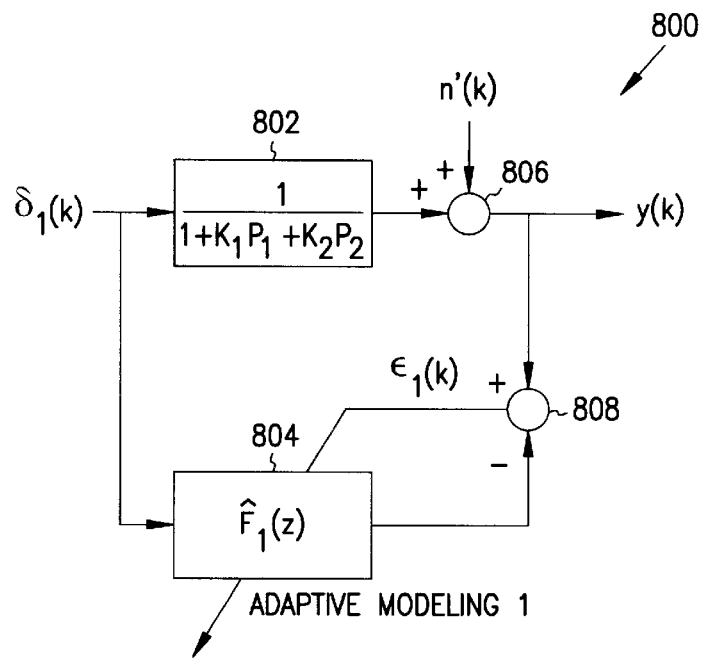
FIG. 8 is a block diagram illustrating a stage-1 adaptive modeling scheme for the dual-stage servomechanism shown in FIG. 7.

Referring to FIG. 8, the stage-1 adaptive modeling scheme is illustrated by a block diagram 800, with components including an equivalent unknown plant ($1/(1+K_1P_1+K_2P_2)$) 802, an adaptive modeling filter ($\hat{F}_1(z)$) 804, a summation element 806, and a difference element 808. The identified signals include first dither signal $\delta_1(k)$ as the input signal, a first modeled error signal $\epsilon_1(k)$, an equivalent open-loop plant disturbance n(k), and an output signal y(k). This scheme is generally similar to the adaptive modeling scheme of FIG. 5, but with first dither signal $\delta_1(k)$ driving both the equivalent unknown plant $1/(1+K_1P_1+K_2P_2)$ and the adaptive filter $\hat{F}_1(z)$. From FIG. 7, the equivalent open-loop disturbance n'(k) can be derived as:

$$n'(k) = (1/(1+K_1P_1+K_2P_2))*n(k) \tag{10}$$

By applying equation (3) above to the stage-1 adaptive modeling scheme of FIG. 8, after the convergence of the parameters of the adaptive model, the transfer function of the FIR filter $\hat{F}_1(z)$ will closely match the equivalent plant as follows:

$$\hat{F}_1(z) = \frac{1}{1+K_1P_1+K_2P_2} \tag{11}$$

The purpose of stage-1 is to model the sensitivity function of the dual-stage servo for use as part of the reference model in stage-2. The effect of disturbance to plant modeling has been minimized. In other embodiments, instead of the adaptive modeling of stage-1, the model of the sensitivity function used in stage-2 could be obtained from any other system identification method. However, only the adaptive modeling of stage-1 fits the combined adaptive modeling scheme described below.

Stage-2: Indirect Model-Reference PZT Inverse

Stage-2 of the two-stage indirect adaptive modeling scheme is the indirect model-reference inverse of the PZT system. The adaptive process will generate the parameters of the compensator for the actual PZT system such that the compensated PZT system will respond just like the ideal PZT model. In FIG. 7, reference input u(k) and first dither signal $\delta_1(k)$ are both set to zero during the stage-2 process. By using second dither signal $\delta_2(k)$, which provides a zero-mean white dither signal, as the input voltage to actual PZT system $P_2(z)$, the transfer function between second dither signal $\delta_2(k)$ and the position measurement y(k) can be derived from FIG. 7 as:

$$\frac{Y(z)}{\Delta_2(z)} = \frac{P_2}{1+K_1P_1+K_2P_2} \tag{12}$$

The transfer function in equation (12) would be the equivalent open-loop plant in the stage-2 scheme.

Figure 9:
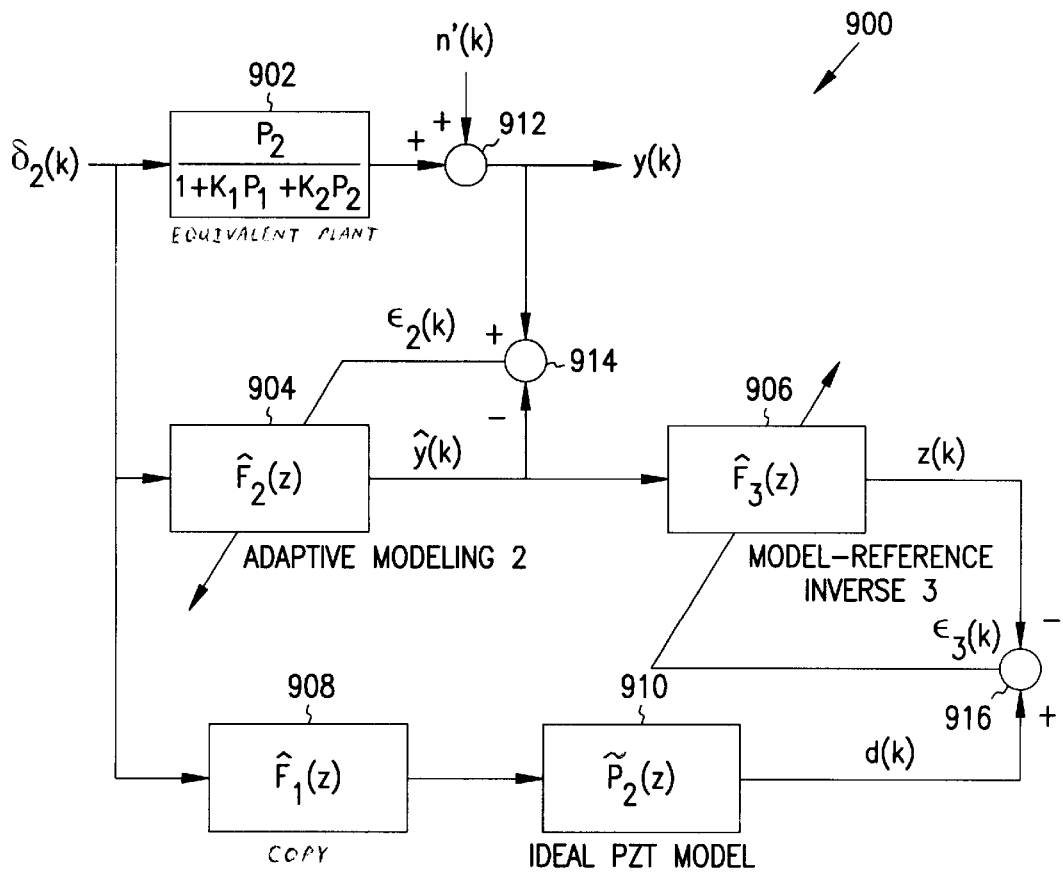
FIG. 9 is a block diagram illustrating a stage-2 indirect model-reference PZT inverse scheme for the dual-stage servomechanism shown in FIG. 7.

Referring to FIG. 9, the stage-2 indirect model-reference inverse of the PZT system scheme is illustrated by a block diagram 900. The components include an equivalent unknown plant ($P_2/(1+K_1P_1+K_2P_2)$) 902, an adaptive modeling 2 filter ($\hat{F}_2(z)$) 904, a model-reference inverse 3 adaptive filter ($\hat{F}_3(z)$) 906, a copy of adaptive filter $\hat{F}_1(z)$ from the stage-1 process, an ideal PZT model ($\tilde{P}_2(z)$) 910, a summation element 912, and first and second difference elements 914 and 916. The identified signals include second dither signal $\delta_2(k)$ as the input signal, equivalent open-loop plant disturbance n'(k), a contaminated plant output signal y(k) (i.e., the position measurement), a second modeled error signal $\epsilon_2(k)$, an estimated plant output signal $\hat{y}(k)$ without effects of disturbances, an actual output signal z(k), a third modeled error signal $\epsilon_3(k)$, and a desired output signal d(k).

The equivalent open-loop disturbance n'(k) is also derived from equation (10). The transfer function $\hat{F}_1(z)$ obtained from the stage-1 process is in cascade with the given ideal PZT model $\tilde{P}_2(z)$ as the reference model. The function of the adaptive filter $\hat{F}_2(z)$ is to model the equivalent unknown plant. The adaptive filter $\hat{F}_3(z)$ is the model-reference PZT inverse. The second input dither $\delta_2(k)$ now drives the equivalent unknown plant $P_2/(1+K_1P_1+K_2P_2)$, the adaptive filters $\hat{F}_2(z)$ and $\hat{F}_3(z)$, and the reference model $\hat{F}_1(z)\tilde{P}_2(Z)$. Comparing FIG. 9 to FIG. 6 shows that these two schemes are generally similar. Thus, it can be seen that equations (6) through (8), derived in reference to FIG. 6, can be applied to FIG. 9.

In other words, the application of equations (6) through (8) to FIG. 9 shows that, after convergence of the parameters of adaptive filters $\hat{F}_2(z)$ and $\hat{F}_3(z)$, the transfer function of $\hat{F}_2(z)$ will closely match that of the equivalent unknown plant, and the transfer function of $\hat{F}_2(z)\hat{F}_3(z)$ will also closely match that of the reference model $\hat{F}_1(z)\tilde{P}_2(Z)$, as indicated by equations (13) and (14), respectively:

$$\hat{F}_2(z) \cong \frac{P_2}{1+K_1P_1+K_2P_2} \tag{13}$$

$$\hat{F}_2(z)\hat{F}_3(z) \cong \hat{F}_1(z)\tilde{P}_2(z) \tag{14}$$

By substituting equations (11) and (13) into equation (14), the model-reference inverse adaptive filter $\hat{F}_3(z)$ can be derived as:

$$\hat{F}_3(z) \cong \frac{\tilde{P}_2(z)}{P_2(z)} \tag{15}$$

From equation (15), the filter $\hat{F}_3(z)$, which can be referred to as an FIR filter, now can be used as the PZT compensator C in cascade with the actual PZT system $P_2(z)$. In other words, adaptive filter $\hat{F}_3(z)$ can be substituted for compensator 408 in FIG. 4. The result is a compensated PZT system whose overall transfer function will closely match given ideal PZT model $\tilde{P}_2(z)$, as indicated by equation (16):

$$\hat{F}_3(z)P_2(z) \cong \tilde{P}_2(z) \tag{16}$$

Combined Indirect Adaptive Filtering Scheme

In another embodiment of the present invention, if the system can support the injections of two uncorrelated dither signals $\delta_1(k)$ and $\delta_2(k)$ simultaneously, then the two-stage indirect adaptive filtering scheme described above in relation to FIGS. 7 through 9 can be merged into a single, combined scheme. This combined scheme, which is illustrated by a block diagram 1000 in FIG. 10, includes three (3) adaptive filters (i.e., $\hat{F}_1(z)$, $\hat{F}_2(z)$, and $\hat{F}_3(z)$) that run together to perform the same functions as the two-stage indirect adaptive filtering scheme that is described above.

Figure 10:
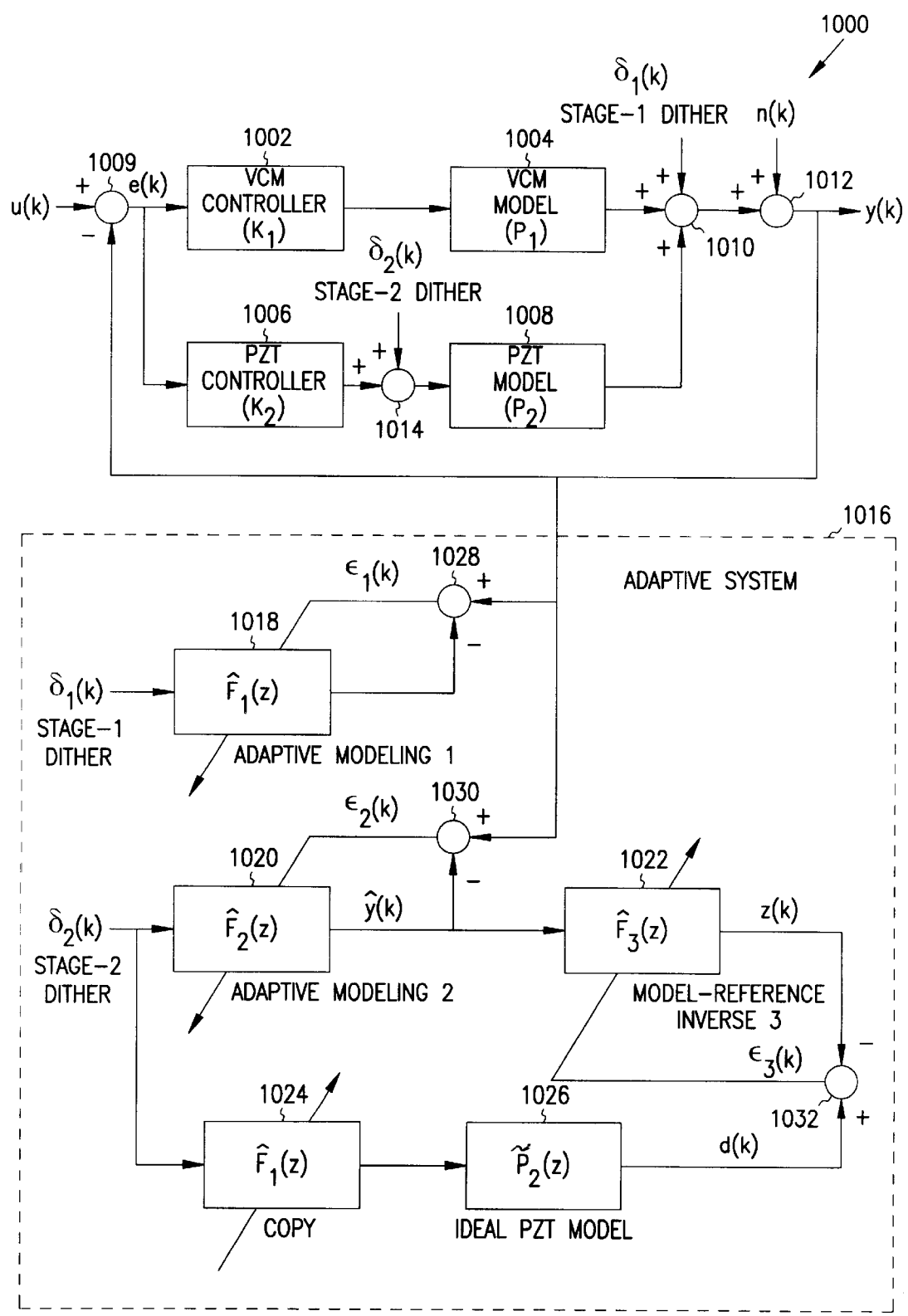
FIG. 10 is a block diagram illustrating a combined indirect adaptive filtering scheme that merges the stage-1 scheme of FIG. 8 and the stage-2 scheme of FIG. 9.

The components of diagram 1000 include a VCM controller ($K_1$) 1002, a VCM model ($P_1$) 1004, a PZT controller ($K_2$) 1006, a PZT model ($P_2$) 1008, a first difference element 1009, and first, second and third summation elements 1010, 1012 and 1014. The identified signals include a reference position signal u(k), a position error signal (PES) e(k), the plant disturbance effect on position signal n(k), an actual position signal y(k), a stage-1 dither signal $\delta_1(k)$, and a stage-2 dither signal $\delta_2(k)$. Also shown in FIG. 10 is an adaptive system 1016, which receives the y(k) signal. System 1016 includes an adaptive modeling 1 filter ($\hat{F}_1(z)$)

1018, an adaptive modeling 2 filter ($\hat{F}_2(z)$) 1020, a model-reference inverse 3 adaptive filter ($\hat{F}_3(z)$) 1022, a copy of the first adaptive filter ($\hat{F}_1(z)$) 1024, an ideal PZT model ($\tilde{P}_2(z)$) 1026, and second, third and fourth difference elements 1028, 1030 and 1032. The identified signals include the first dither signal $\delta_1(k)$, a first modeled error signal $\epsilon_1(k)$, the second dither signal $\delta_2(k)$ a second modeled error signal $\epsilon_2(k)$, an estimated plant output signal $\hat{y}(k)$ without the effects of disturbances, an actual output signal $z(k)$, a third modeled error signal $\epsilon_3(k)$, and desired output signal $d(k)$.

Adaptive filter $\hat{F}_1(z)$ will treat the position dither signal $\delta_1(k)$ as its input signal, and will treat both the PZT dither signal $\delta_2(k)$ and the plant disturbance $n(k)$ as the disturbance sources. Meanwhile, the adaptive filter $\hat{F}_2(z)$ will treat the PZT dither signal $\delta_2(k)$ as its input signal, and will treat both the position dither $\delta_1(k)$ and the plant disturbance $n(k)$ as the disturbance sources. Note that the additional dither disturbance will increase the noise level at each of these adaptive filters.

A comparison between the combined indirect adaptive filtering scheme of FIG. 10 and the two-stage indirect adaptive filtering scheme of FIGS. 7 through 9 shows that the largest difference appears in the reference path. In particular, in the two-stage scheme, the model of sensitivity function $\hat{F}_1(z)$, which is obtained from stage-1 and is used as part of the reference model at stage-2, is time-invariant. In contrast, in the combined scheme, the FIR parameters of the filter $\hat{F}_1(z)$ in the reference path merely copies the instant values generated by the corresponding adaptive modeling path, and updates at every time-step during the entire process in the combined scheme. This difference is indicated by the arrow passing through block 1024 in FIG. 10, which is not present in block 908 of FIG. 9. Thus, in the combined scheme, the reference model (i.e., $\hat{F}_1(z)\tilde{P}_2(z)$) is therefore time-variant.

An advantage of the combined scheme in comparison to the two-stage scheme is that the adaptation of the three filters $\hat{F}_1(z)$, $\hat{F}_2(z)$ and $\hat{F}_3(z)$ is subject to the same operating condition of the unknown plant. Thus, the modeling error due to the transition from stage-1 to stage-2 in the two-stage scheme will be reduced. For example, plant disturbance and environment temperatures might be different at each stage in disc drives. A disadvantage of the combined scheme in comparison to the two-stage scheme is that misadjustment due to gradient noise in the FIR parameters of the adaptive filters may increase due to the increased power of disturbances. The model misadjustment can be reduced by decreasing the adaptive constant gains. However, slower convergence of the adaptive parameters would then be expected.

Simulation Results

Figure 11:
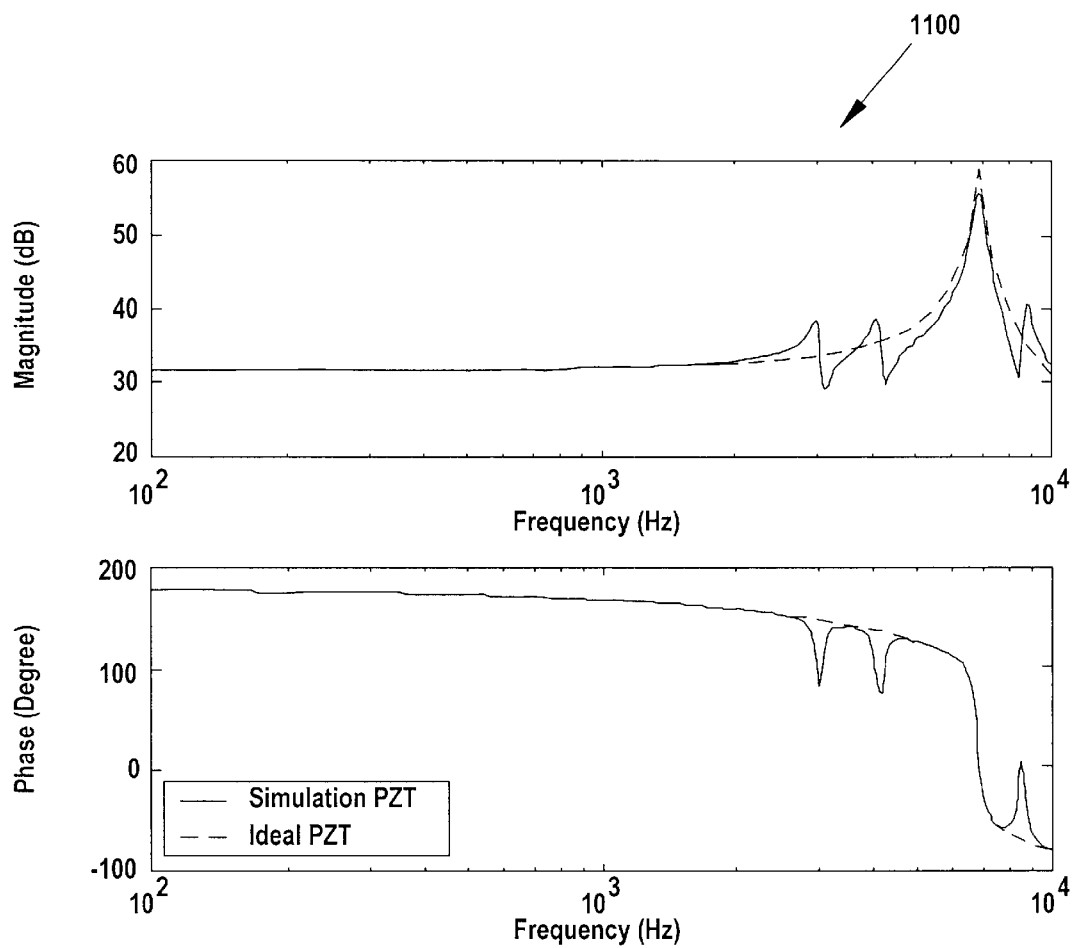
FIG. 11 are graphs illustrating frequency response of a simulation PZT model and the ideal PZT model.

Simulations of the two-stage indirect adaptive filtering scheme, applied on the dual-stage servo, were performed using the MATLAB/SIMULINK™ simulation software. Graphs 1100 in FIG. 11 provide a comparison between the frequency response of the simulation PZT model and the given reference PZT model (i.e., the ideal PZT model). The ideal PZT model only has the sway mode at around 7,000 Hz. Note that three unwanted resonance modes, at around 3,000 Hz, 4,000 Hz and 8,500 Hz have been added into the simulation PZT model in order to approximate the actual PZT system. The PZT element is assumed to have a saturation limit, and the three adaptive FIR filters have the same tap-length of 100 taps. The system sampling time was 53 $\mu$sec. The simulation was performed for both the two-stage scheme and the combined scheme. The simulation results are described below.

Figure 12:
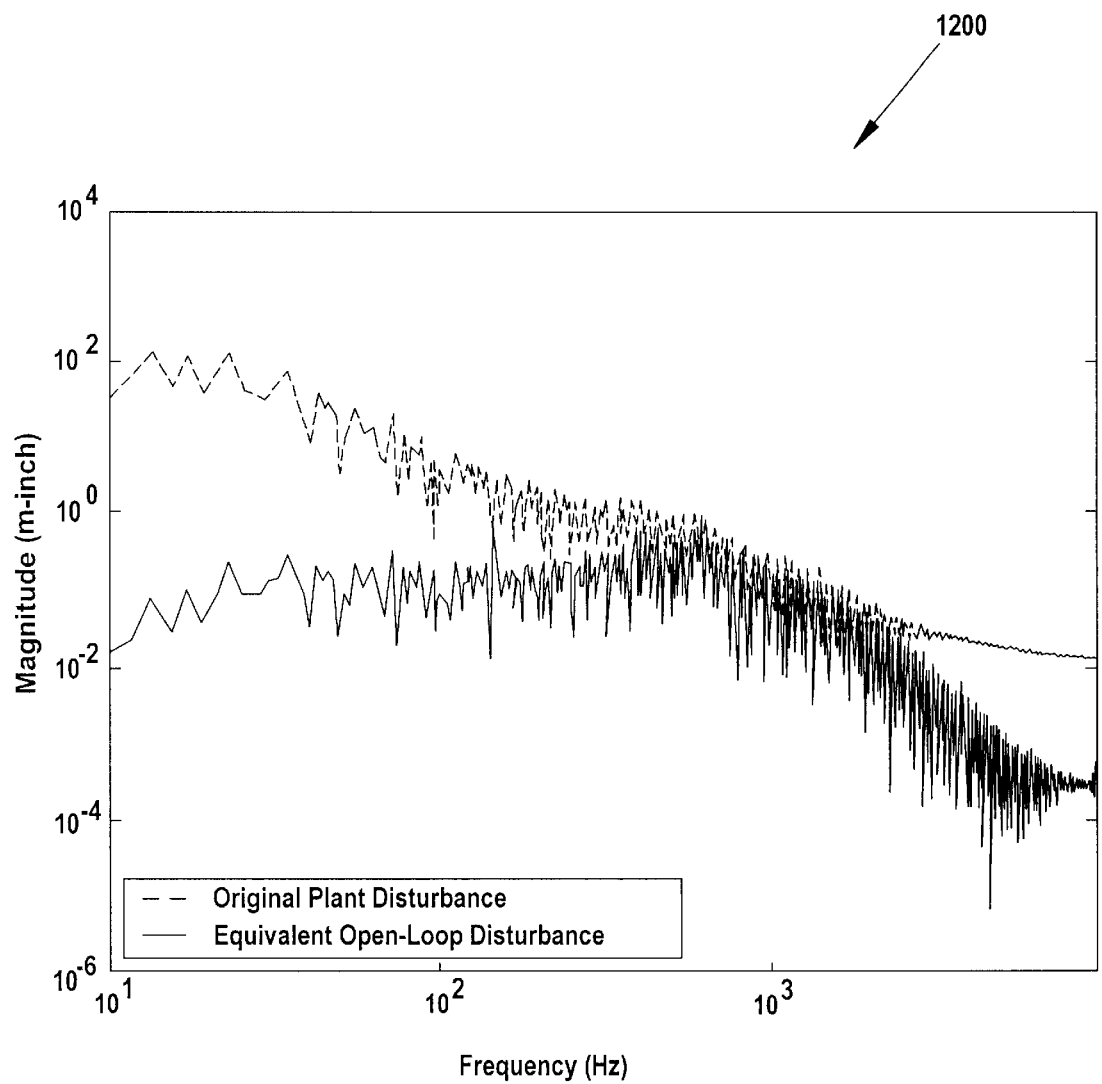
FIG. 12 is a graph illustrating frequency spectrum of the plant disturbance in the simulations of both the two-stage scheme and the combined scheme.

The frequency spectrum of the plant disturbance used in the simulations is shown in FIG. 12. The plant disturbance $n(k)$ simulated the effect of rotational vibration on the position measurements. The frequency spectrum of the equivalent open-loop disturbance $n'(k)$ is also shown. It can be seen that frequency components of the plant disturbance below 1,000 Hz were attenuated by the sensitivity function of the system, and that the frequency components of the equivalent open-loop disturbance below 2,000 Hz were relatively high. The effect of disturbances on the adaptive modeling in the simulations was also investigated, as is described below.

Simulation of Two-Stage Indirect Adaptive Filtering Scheme

Figure 13:
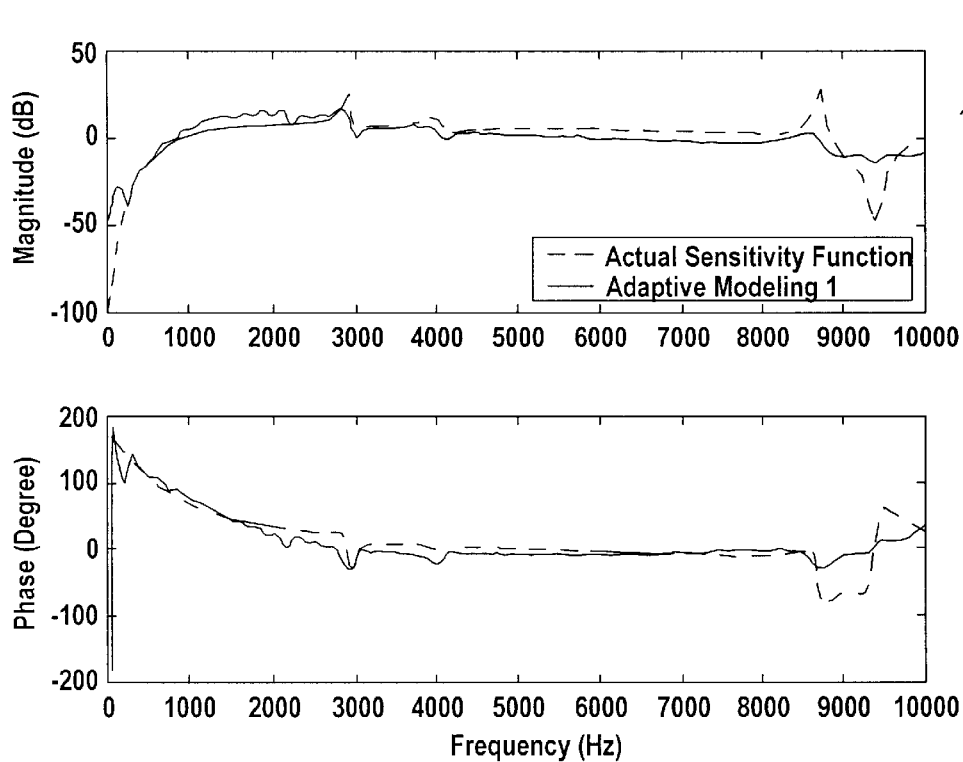
FIG. 13 are graphs showing, for stage-1 of the two-stage scheme, frequency response of the converged transfer function $\hat{F}_1(z)$ and the actual sensitivity function.

As indicated above, the purpose of stage-1 of the two-stage indirect adaptive filtering scheme is to model the sensitivity function for use in the reference path of stage-2 (i.e., to determine $\hat{F}_1(z)$). From the stage-1 scheme of FIG. 8, the stage-1 dither signal $\delta_1(k)$ was injected into both the position measurement and the adaptive filter $\hat{F}_1(z)$. The power of the dither signal was chosen as large as possible for a clear modeling signal while remaining below the saturation limit of the PZT system. The total running time of stage-1 was two (2) seconds for convergence of the FIR parameters of $\hat{F}_1(z)$. The frequency response of the converged transfer function $\hat{F}_1(z)$ and the actual sensitivity function are illustrated by graphs 1300 in FIG. 13. As shown by graphs 1300, the frequency response of $\hat{F}_1(z)$ roughly followed the actual sensitivity function at most frequencies. However, the modeling at the low-frequency part of the spectrum was not as good because the interference caused by the equivalent open-loop disturbance is relatively high at the low-frequency part.

Figure 14:
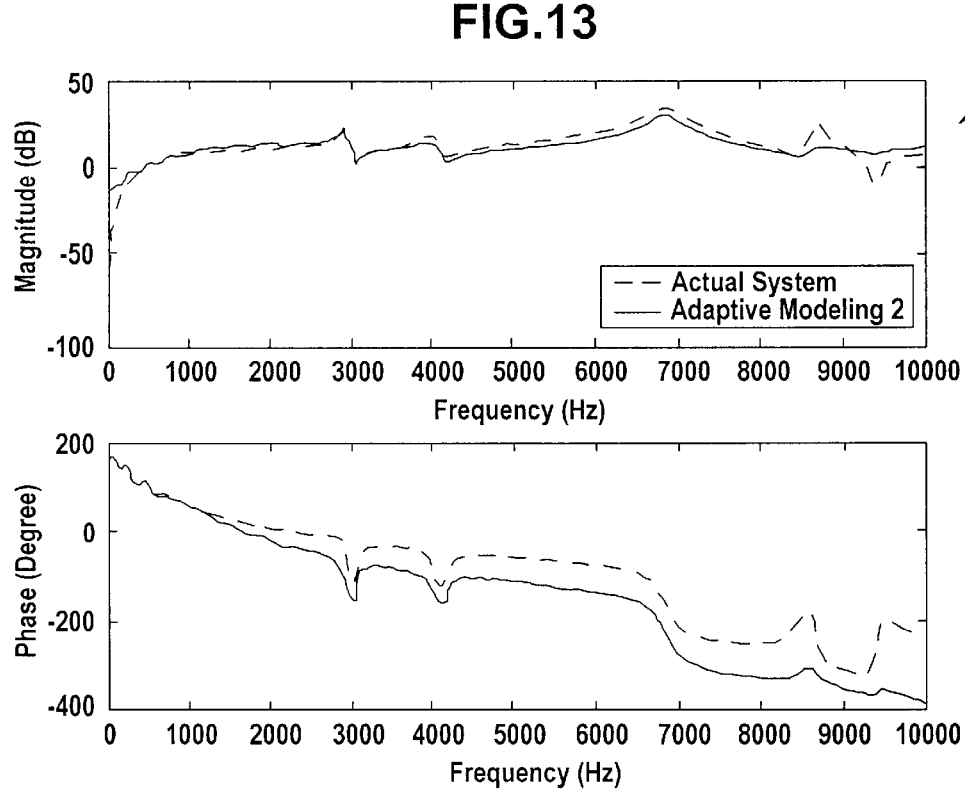
FIG. 14 are graphs illustrating, for stage-2 of the two-stage scheme, frequency response of the converged transfer function $\hat{F}_2(z)$ and the equivalent plant.

As shown in FIG. 9, stage-2 of the two-stage indirect adaptive filtering scheme includes two adaptive filters $\hat{F}_2(z)$ and $\hat{F}_3(z)$. The transfer function $\hat{F}_1(z)$ that was obtained from stage-1 was cascaded with the given ideal PZT model $\tilde{P}_2(z)$ to provide the reference model. The stage-2 dither signal $\delta_2(k)$ was injected into the PZT system, the adaptive filter $\hat{F}_2(z)$, and the reference model. The total running time of stage-2 was four seconds for convergence of the FIR parameters for $\hat{F}_2(z)$ and $\hat{F}_3(z)$. The frequency response of the converged transfer function $\hat{F}_2(z)$ and the equivalent plant are shown by graphs 1400 in FIG. 14. As shown, the frequency response of $\hat{F}_2(z)$ roughly followed the equivalent plant at most of the frequencies.

Figure 15:
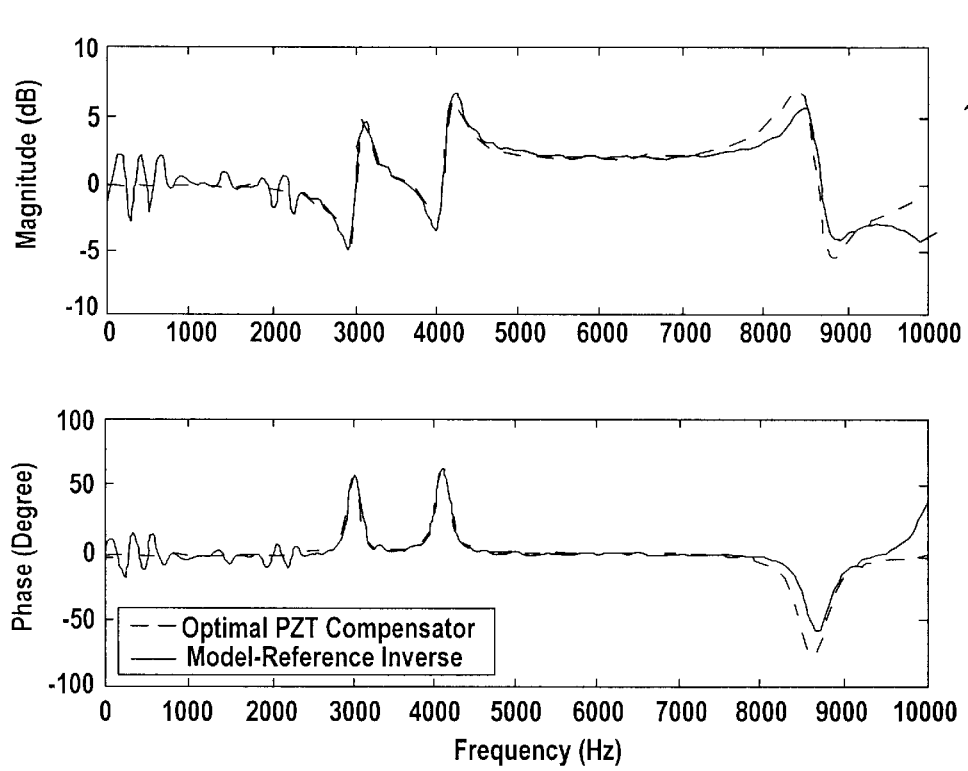
FIG. 15 are graphs illustrating, for stage-2 of the two-stage scheme, frequency response of the converged transfer function $\hat{F}_3(z)$ and the optimal PZT compensator $\tilde{P}_2(z)/P_2(z)$.

In simulations, the optimal PZT compensator $\tilde{P}_2(z)/P_2(z)$ may be solved in advance for reference. Graphs 1500 in FIG. 15 show the frequency response of the converged transfer function $\hat{F}_3(z)$ and the optimal PZT compensator $\tilde{P}_2(z)/P_2(z)$. A review of graphs 1500 shows that the frequency response of $\hat{F}_3(z)$ accurately matches the optimal PZT compensator except for ripples that exist below 2,500 Hz which are caused by plant disturbance. The modeling error caused by disturbances could be decreased by reducing the adaptive constant gains and increasing the total running time. Note that, even though the modeling error exists in both $\hat{F}_1(z)$ and $\hat{F}_2(z)$, the modeling error present in the final solution $\hat{F}_3(z)$ was not aggravated.

Figure 16:
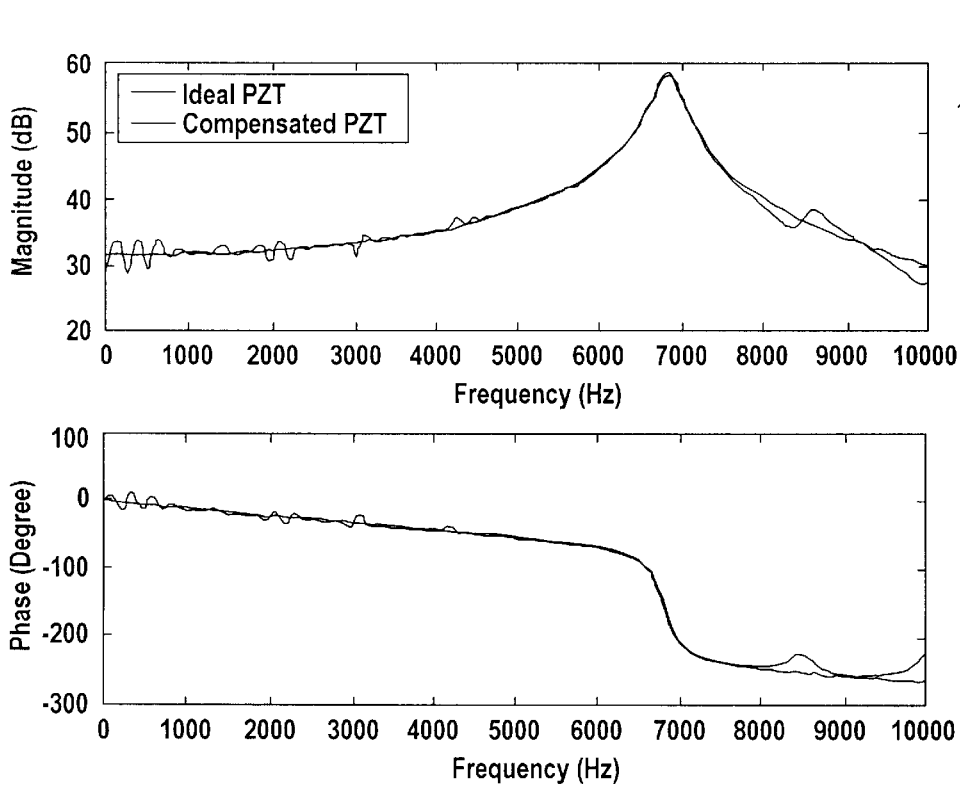
FIG. 16 are graphs illustrating, for the two-stage scheme, frequency response of the compensated PZT system and the ideal PZT model.

Converged FIR filter $\hat{F}_3(z)$ can then be used as the compensator C which is cascaded with the actual PZT system $P_2(z)$. The graphs 1600 in FIG. 16 show the frequency response of the compensated PZT system $\hat{F}_3(z)P_2(z)$ and the given ideal PZT model $\tilde{P}_2(z)$. As indicated by the graphs 1600, the two unwanted resonance modes which previously appeared at around 3,000 Hz and 4,000 Hz (FIG. 11) have been canceled, and the peak at 8,500 Hz has been attenuated by compensator $\hat{F}_3(z)$.

Simulation of Combined Indirect Adaptive Filtering Scheme

Figure 17:
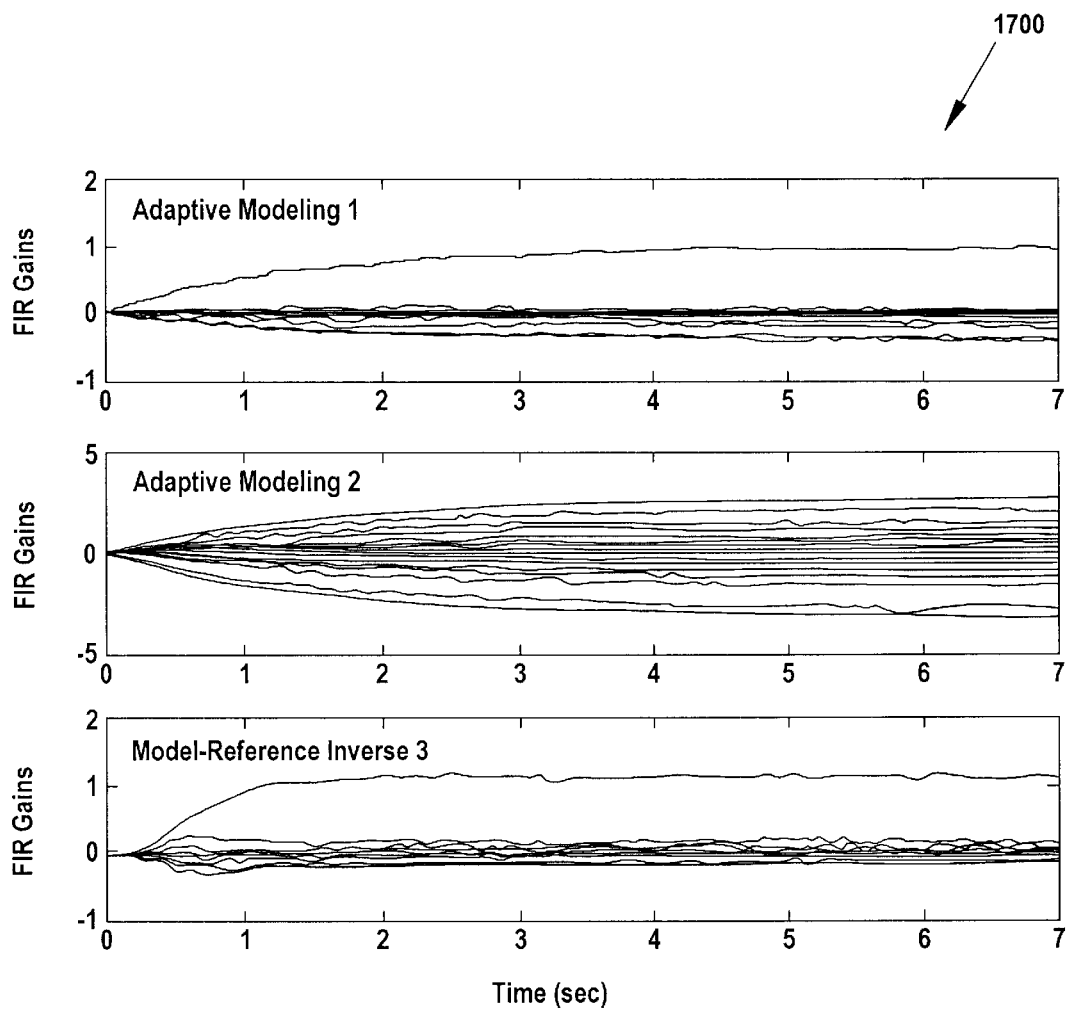
FIG. 17 are graphs illustrating, for the combined scheme, convergence of the finite impulse response (FIR) parameters at each of the three adaptive filters.

In the combined indirect adaptive filtering scheme illustrated in FIG. 10, two uncorrelated dither signals $\delta_1(k)$ and $\delta_2(k)$ are simultaneously injected into the system. As noted above, the reference model in this case is now time-variant (as indicated by the arrow through block 1024 in FIG. 10). In the simulation of the combined scheme, $\hat{F}_1(z)$, $\hat{F}_2(z)$ and $\hat{F}_3(z)$ were implemented by three 100-tap adaptive filters running together, and the total running time was seven seconds for convergence of the FIR parameters. The convergence of the FIR parameters for each adaptive filter is illustrated by graphs 1700 in FIG. 17. As shown, the adaptive constant gain was tuned at each adaptive filter in a similar time of convergence.

Figure 18:
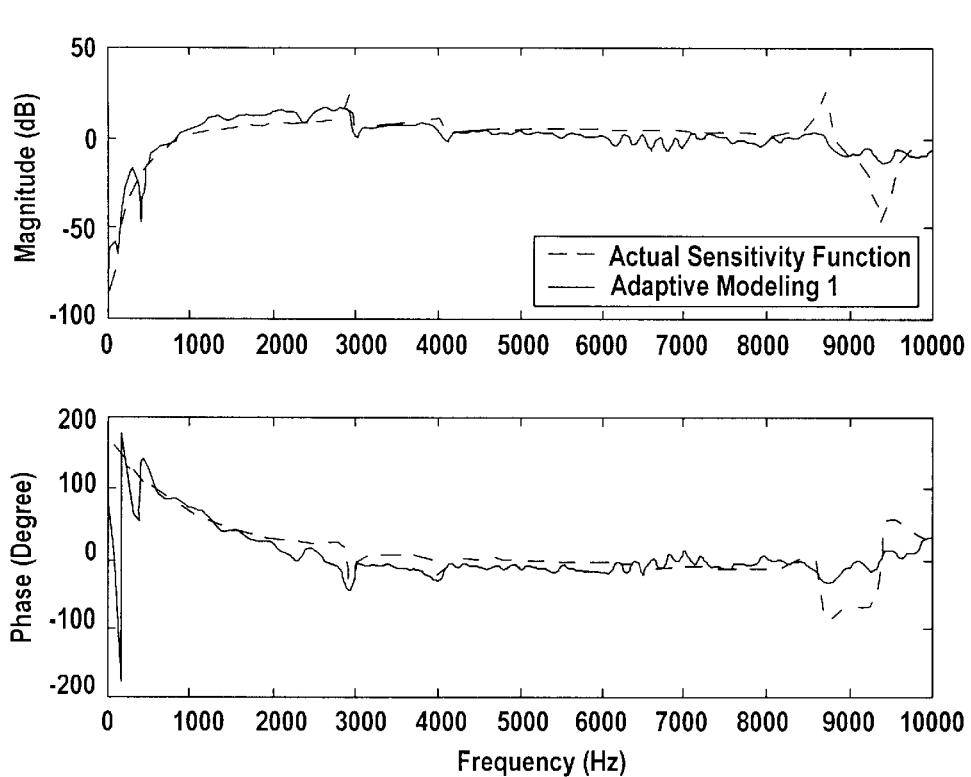
FIG. 18 are graphs illustrating, for the combined scheme, frequency response of the converged transfer function $\hat{F}_1(z)$ and the actual sensitivity function.
Figure 19:
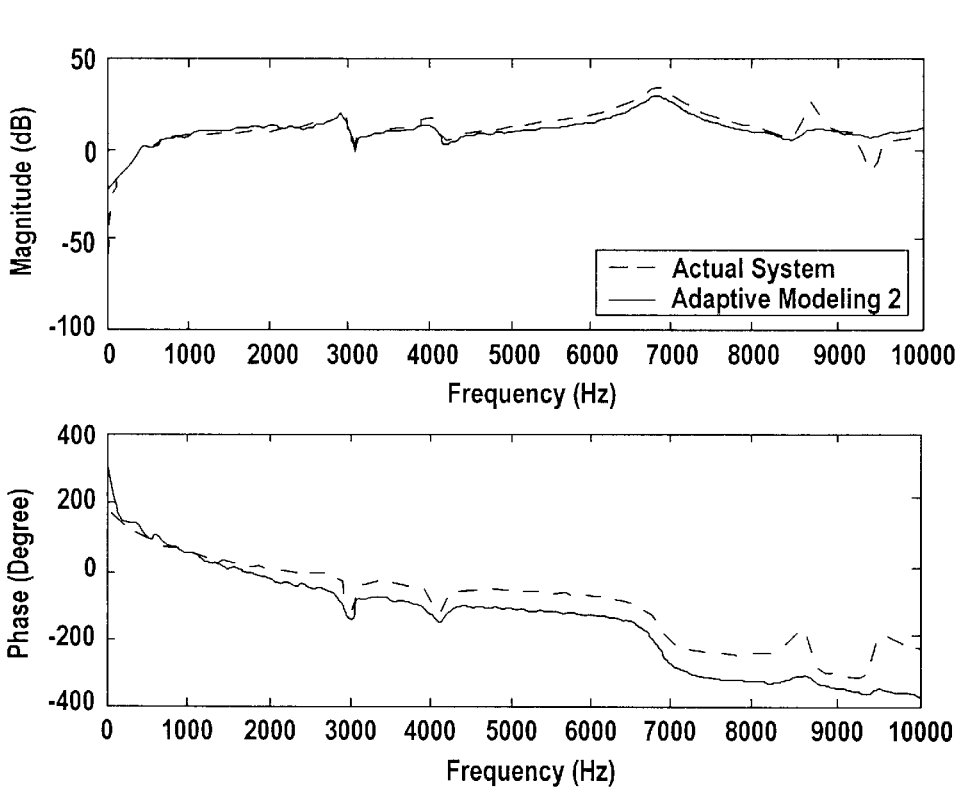
FIG. 19 are graphs illustrating, for the combined scheme, frequency response of the converged transfer function $\hat{F}_2(z)$ and the equivalent plant.
Figure 20:
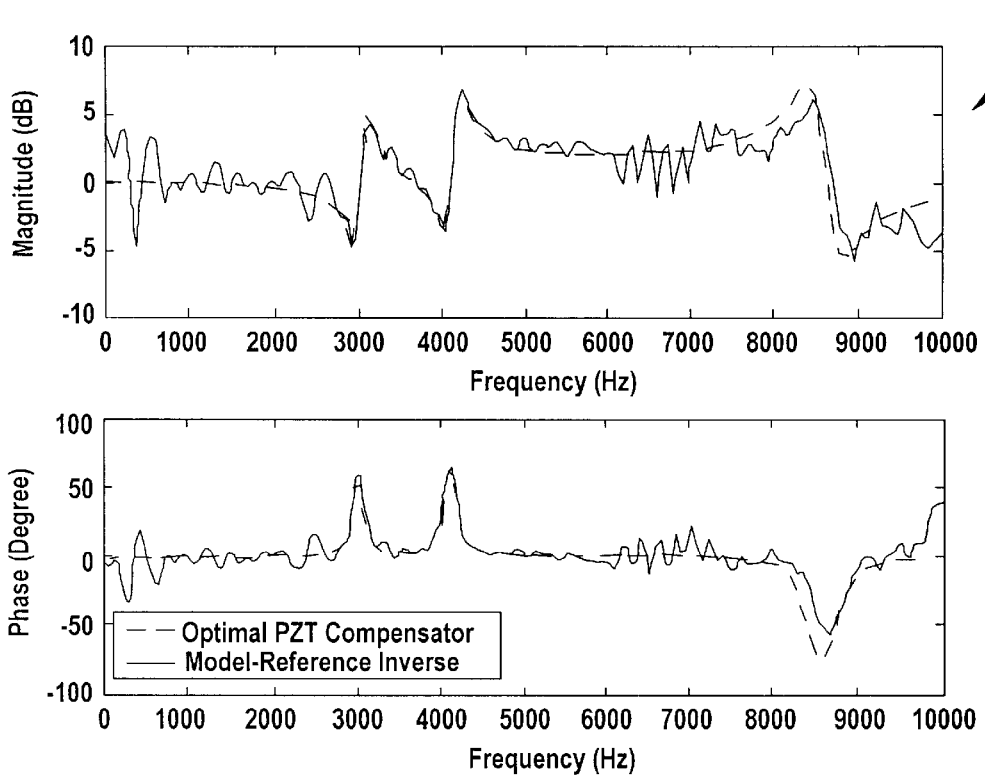
FIG. 20 are graphs illustrating, for the combined scheme, frequency response of the converged transfer function $\hat{F}_3(z)$ and the optimal PZT compensator $\tilde{P}_2(z)/P_2(z)$.
Figure 21:
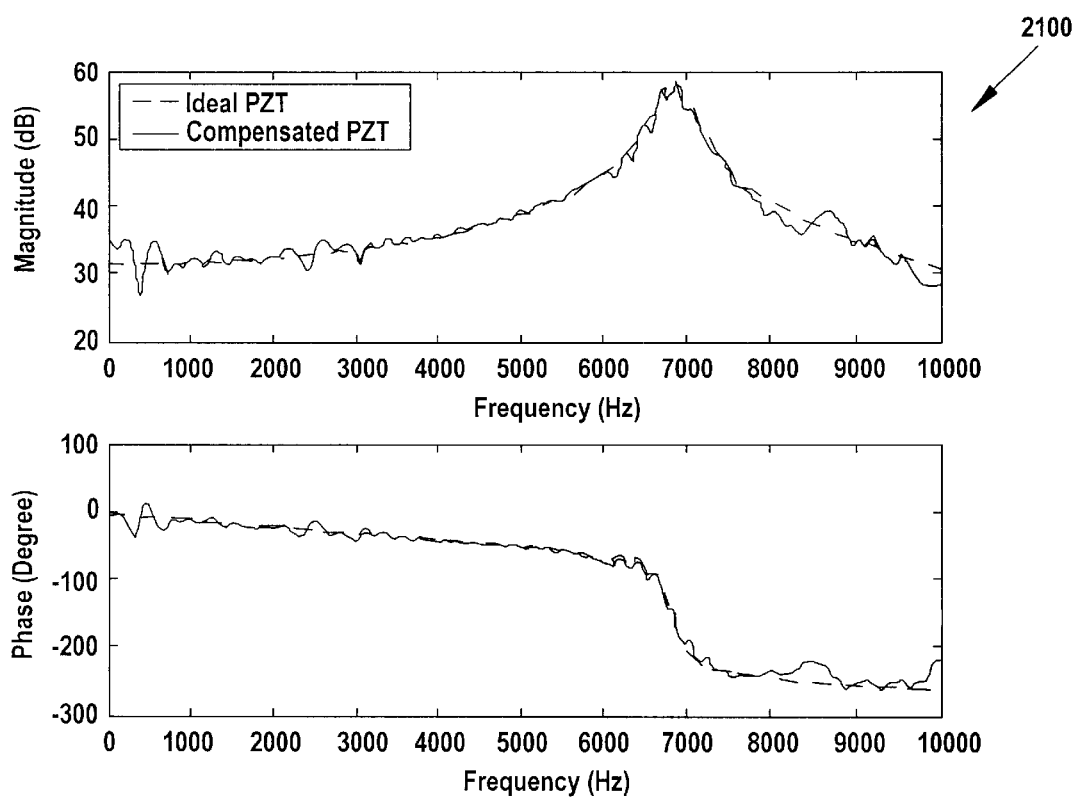
FIG. 21 are graphs illustrating, for the combined scheme, frequency response of the compensated PZT system and the ideal PZT model.

The frequency response of the converged transfer function $\hat{F}_1(z)$ and the actual sensitivity function are shown by graphs 1800 in FIG. 18. The frequency response of the converged transfer function $\hat{F}_2(z)$ and the equivalent plant is shown by graphs 1900 in FIG. 19. Also, the frequency response of the converged transfer function $\hat{F}_3(z)$ and the optimal PZT compensator $\tilde{P}_2(z)/P_2(z)$ is shown by graphs 2000 in FIG. 20. The simulation showed that the transfer function of $\hat{F}_3(z)$ still accurately matches that of the optimal PZT compensator, even though the frequency response in FIG. 20 looks noisy compared with the simulation result from the two-stage scheme (shown in FIG. 15). The noise effect in the combined scheme was caused by both the plant disturbance and the dither signal. Because the dither signal is unweighted broadband noise, ripples can be found at all frequencies in FIG. 20. The noise effect can also be reduced by decreasing the adaptive constant gains and increasing the total running time for convergence. The frequency response of the compensated PZT system $\hat{F}_3(z)P_2(z)$ and given ideal PZT model $\tilde{P}_2(z)$ is shown by graphs 2100 in FIG. 21. The frequency response of the compensated PZT system appears noisy due to increased power of disturbance. However, the result from the combined scheme (FIG. 21) is similar to that from the two-stage scheme (FIG. 16).

The Effect of Plant Disturbance

Figure 22:
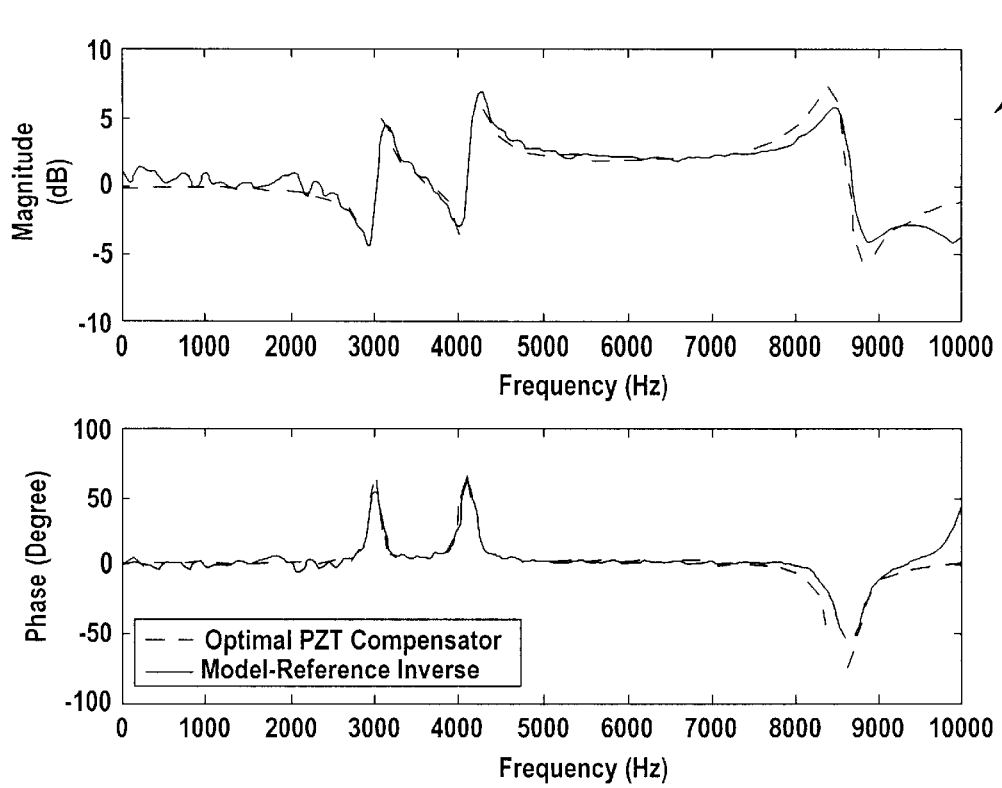
FIG. 22 are graphs illustrating simulation results of the compensator $\hat{F}_3(z)$ with the plant disturbance reduced to 50% of its original amplitude that was used to produce the simulation results shown in FIG. 15.
Figure 23:
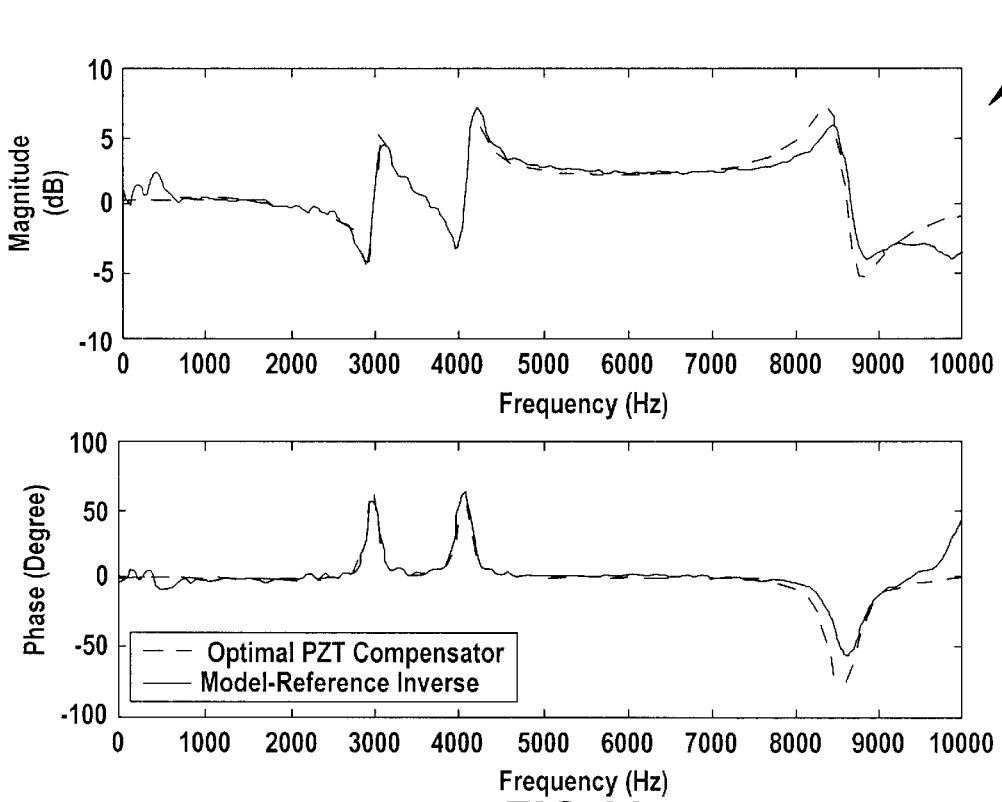
FIG. 23 are graphs illustrating simulation results of the compensator $\hat{F}_3(z)$ with the plant disturbance reduced to 25% of its original amplitude that was used to produce the simulation results shown in FIG. 15.

The objective of this section is to demonstrate that most of the modeling error in the frequency response of $\hat{F}_3(z)$ in FIG. 15 did not come from a defect of the adaptive mechanism, but was due instead to plant disturbance. The prerequisite is that the selected tap length of the adaptive filters is sufficiently long to accurately describe the impulse response of the modeled plant. The same two-stage scheme was simulated again, except that the plant disturbance was reduced to 50% and 25% of its original amplitude that was used in the simulation that resulted in FIG. 15. The graphs 2200 and 2300 in FIGS. 22 and 23 show the simulation results of the compensator $\hat{F}_3(z)$ under the 50% and 25% amplitude of the plant disturbance, respectively. Compared with the previous simulation result shown in FIG. 15, the amplitude of the ripples has been reduced in FIG. 22. Moreover, the improvement is even more significant in FIG. 23. This simulation implies that better modeling results could be reached under lower plant disturbance, and also shows that the most significant modeling error did not come from any defect of the adaptive mechanism, but was caused by the plant disturbance.

As indicated above, model misadjustment from disturbances can be reduced by decreasing the adaptive constant gains. However, slower convergence of the adaptive parameters can be expected in response to these decreases. An alternative method of reducing the ripples that appear in the transfer function $\hat{F}_3(z)$ is to use $\hat{F}_3(z)$'s frequency response data for fitting a linear IIR model, as discussed next.

Linear Model Fitting for Ripple Reduction

In one embodiment of the present invention, infinite impulse response (IIR) model fitting is used to reduce the ripples that exist in the frequency response of the compensator $\hat{F}_3(z)$ determined by either the two-stage scheme or the combined scheme. By using frequency domain data for $\hat{F}_3(z)$, the relatively noisy FIR compensator is converted into a smooth IIR model. The linear model fitting may be performed, for example, using the fitsys command that is provided by the $\mu$-Analysis and Synthesis Toolbox of the MATLAB™ simulation software. See, e.g., Gary J. Balas, John C. Doyle, Keith Glover, Andy Packard and Roy Smith, $\mu$-Analysis and Synthesis Toolbox User s Guide, The Math Works, Inc., 1995. The order of the IIR model, and the frequency dependent weightings, should be selected in advance. The selections will directly affect the model fitting results, so that some prior knowledge of the modeled system would be beneficial for making good selections.

Figure 24:
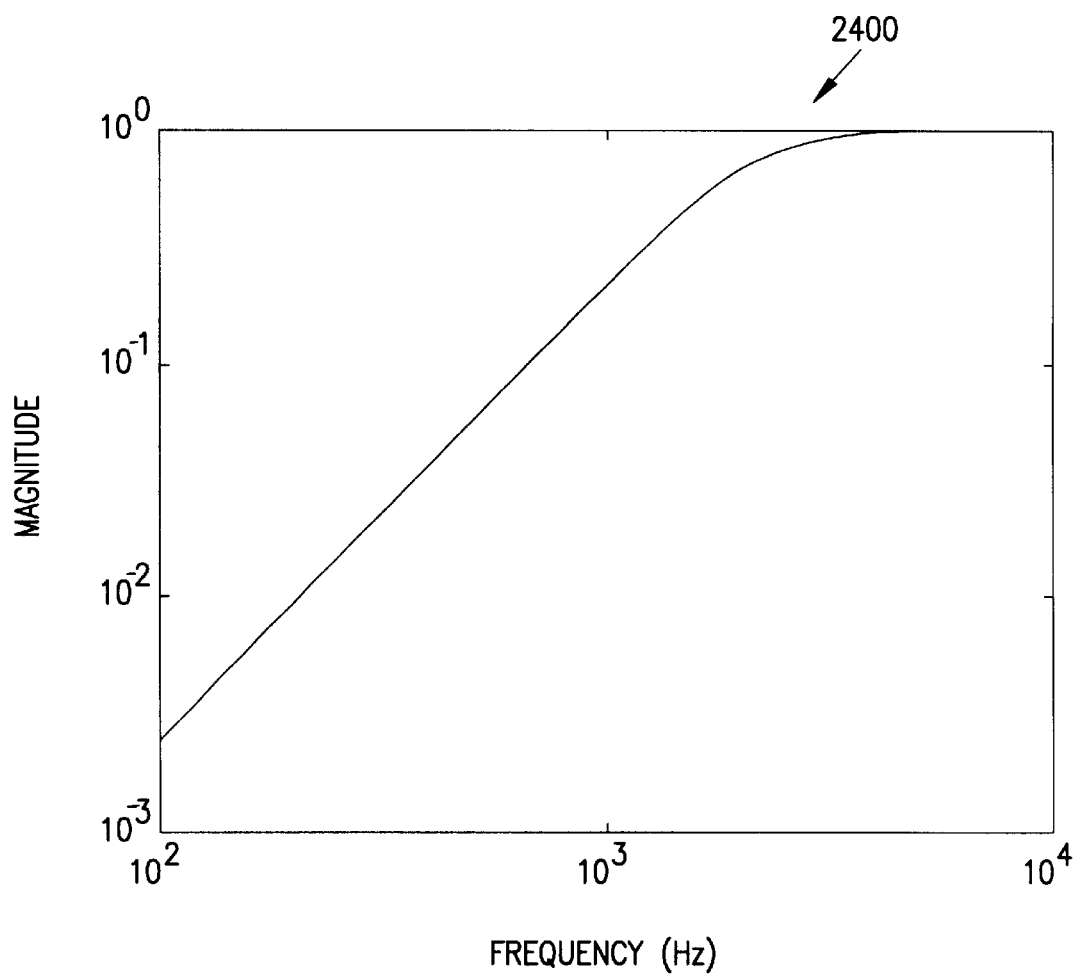
FIG. 24 is a graph illustrating a frequency dependent weight function used in linear model fitting that was performed to reduce ripples in the frequency response of the compensator $\hat{F}_3(z)$ from either the two-stage scheme or combined scheme.

In one example, a $6^{th}$ order IIR model was used, and a $2^{nd}$-order Butterworth high-pass filter having a cut-off frequency of 2,000 Hz was chosen as the frequency dependent weight, as shown in FIG. 24. In this case, the reasons for choosing such a weight function were that the PZT system was known to have a constant gain at the low frequency part of the spectrum, and that the disturbance energy was dominated below 2,000 Hz. Other IIR model orders, and other weightings, could also be used.

Figure 25:
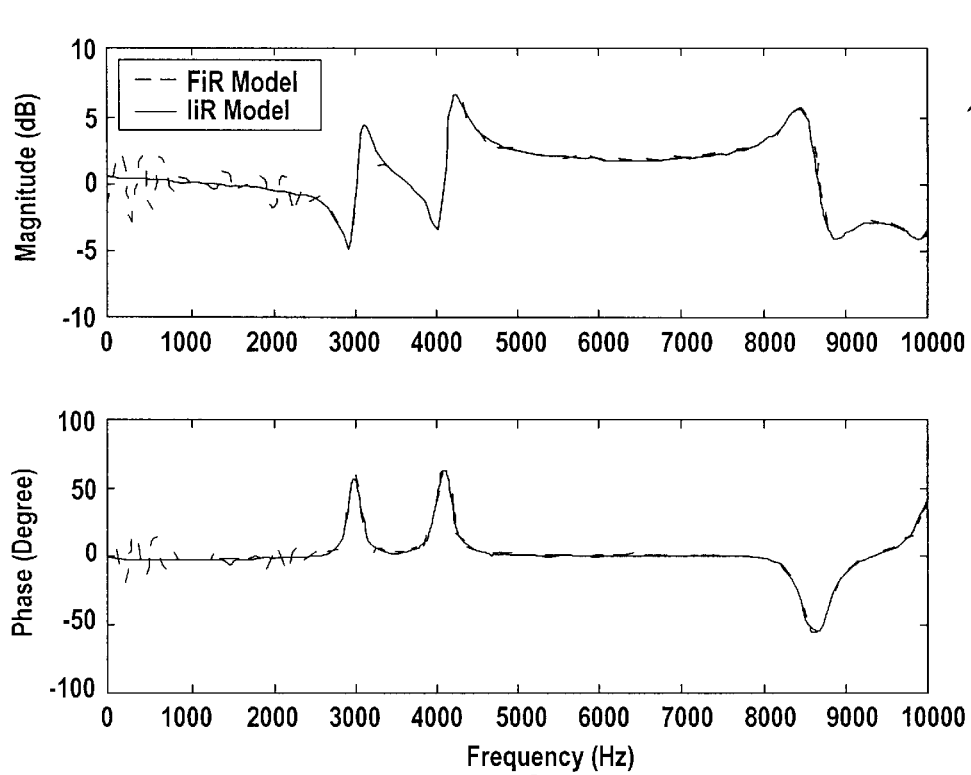
FIG. 25 are graphs illustrating, for the two-stage scheme, frequency response of the FIR compensator and the converted infinite-impulse response (IIR) model.
Figure 26:
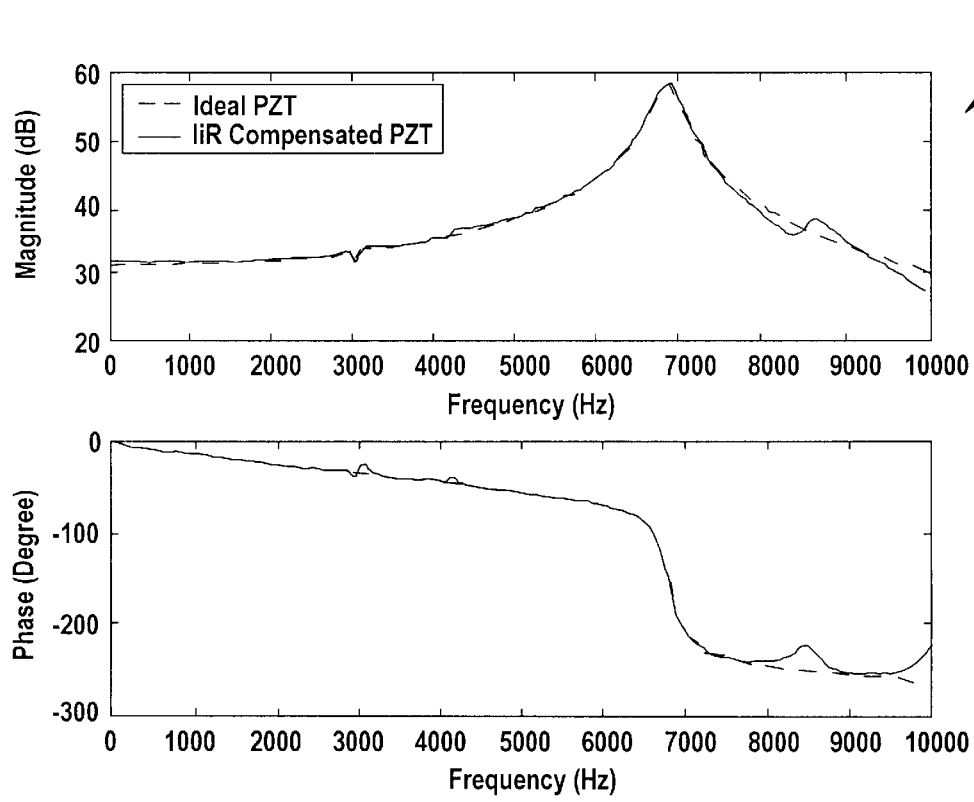
FIG. 26 are graphs illustrating, for the two-stage scheme, frequency response of the IIR compensated PZT system and the ideal PZT model.

The frequency response of the FIR filter that was obtained from the two-stage scheme, and of the IIR filter that was converted from the linear model fitting, are shown by graphs 2500 in FIG. 25. Graphs 2500 show that the IIR model closely matched the FIR filter above 2,000 Hz, and gave a smooth transfer function without ripples. The frequency response of the resultant IIR-compensated PZT system is shown by graphs 2600 in FIG. 26. A comparison with the FIR-compensated PZT system results of FIG. 16 shows that the IIR compensator was superior in this case.

Figure 27:
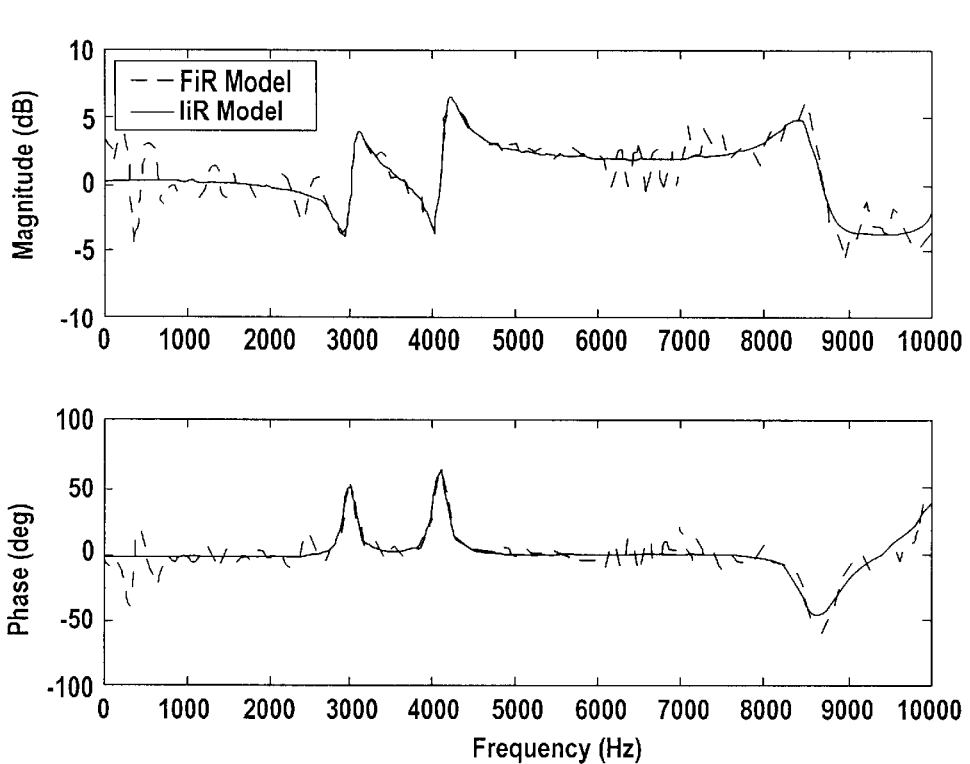
FIG. 27 are graphs illustrating, for the combined scheme, frequency response of the FIR compensator and the converted IIR model.
Figure 28:
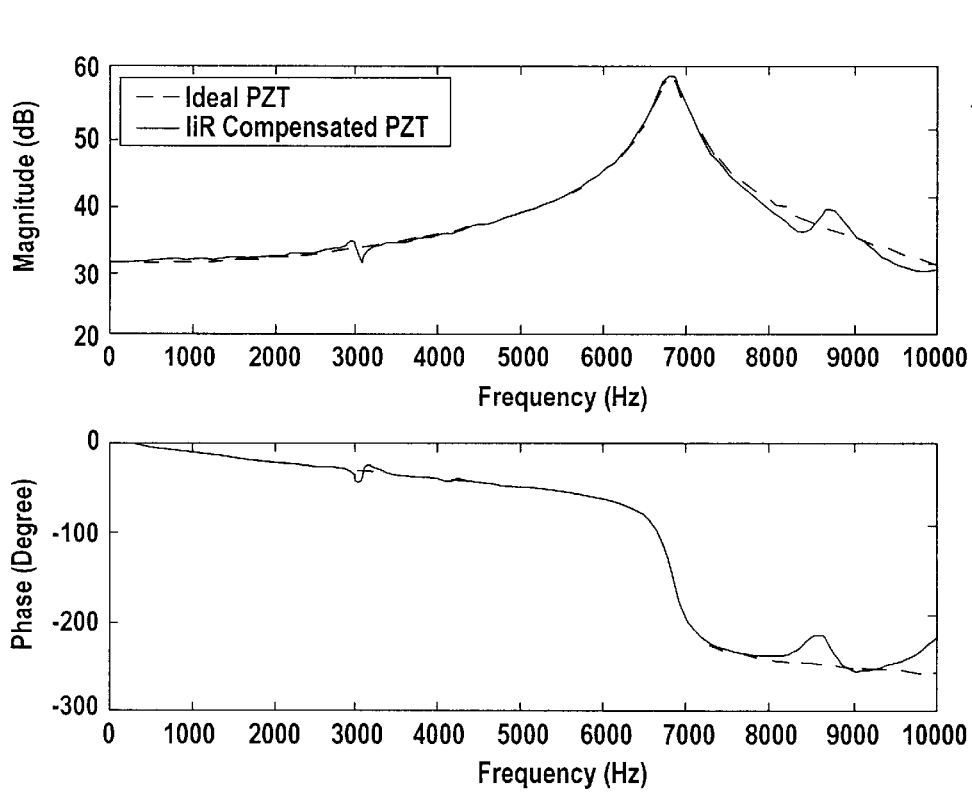
FIG. 28 are graphs illustrating, for the combined scheme, frequency response of the IIR compensated PZT system and the ideal PZT model.

A similar result was obtained when the linear model fitting method was applied to the FIR compensator solved from the combined scheme. In this case, the same model order number and weight function as described above were used for the linear model fitting. The frequency response of the relatively noisy FIR filter from the combined scheme, and of the IIR filter converted from the linear model fitting, are shown by graphs 2700 in FIG. 27. These graphs show that the converted IIR filter retains the same frequency response as the FIR filter, but without ripples. The frequency response of the resultant IIR-compensated PZT system is shown in graphs 2800 in FIG. 28. Compared with the FIR-compensated PZT system results (FIG. 21), the IIR filter provides better compensation, and is superior for implementation.

Thus, in one embodiment of the present invention, the linear model fitting method is used to weed out model misadjustment of adaptive filtering, and is used to complete the plant variation compensation scheme. Another advantage of the linear model fitting technique is that the converted IIR compensator uses less memory space, and fewer computations, in comparison with the FIR filter in applications.

Computer or Information Handling System

Figure 29:
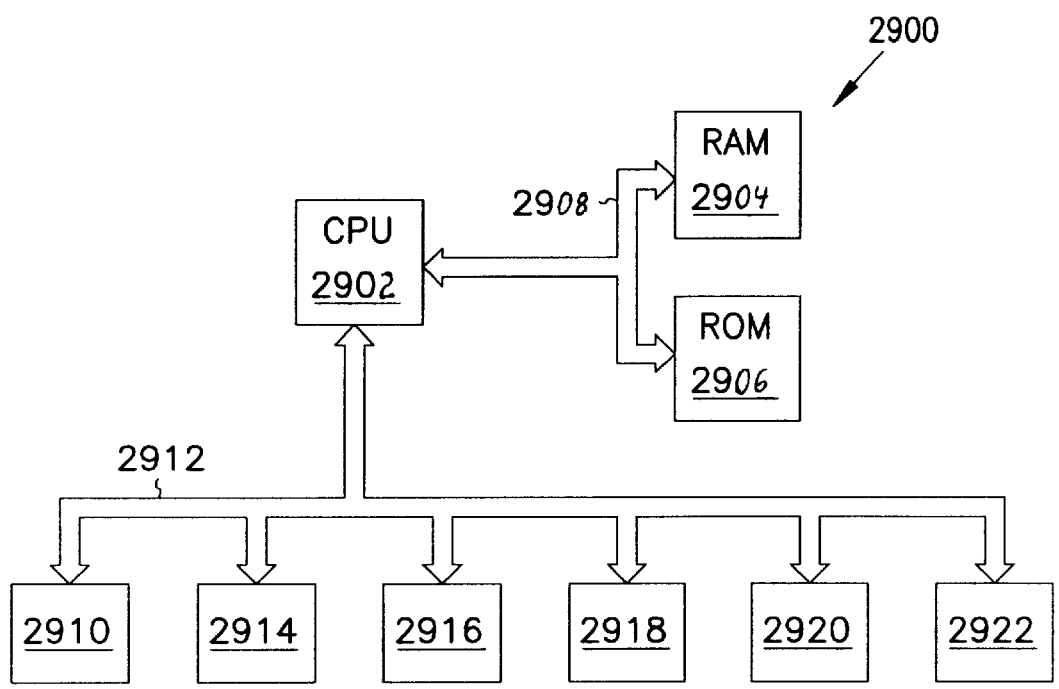
FIG. 29 is a schematic view of a computer or information handling system with one or more disc drives according to one embodiment of the present invention.

Referring to FIG. 29, a computer system 2900 includes one or more dual-actuator disc drives that employ a control system including a PZT compensator in accordance with an embodiment of the present invention. System 2900, which may be referred to as an electronic system or as an information handling system, includes a central processing unit (CPU) 2902, a random access memory (RAM) 2904, a read only memory (ROM) 2906, and a system bus 2908 for communicatively coupling CPU 2902 with RAM 2904 and ROM 2906. System 2900 includes one or more disc drive devices 2910 (only one shown), each of which includes a control system with a PZT compensator for approximating an ideal PZT system as described above. System 2900 also includes an input/output (I/O) bus 2912 for communicatively coupling CPU 2902 with disc drive device(s) 2910. Any type of dual-actuator disc drive may use the methods described above for compensating the PZT system. System 2900 may also include other peripheral devices, such as peripheral devices 2914–2922, attached to bus 2912. Devices 2914–2922 may include other disc drives, magneto optical drives, floppy disc drives, monitors, keyboards or other peripherals.

Conclusion

An automatic PZT compensator tuning scheme using indirect adaptive filtering has been disclosed. Both a two-stage indirect adaptive filtering scheme and a combined adaptive filtering scheme have been described. Two uncorrelated dither injection signals at the position measurement and at the PZT input voltage are used by each scheme, with the two dither signals applied simultaneously in the combined scheme. Based only upon a transducer position measurement, the adaptive system is able to identify the plant variation in the PZT system and obtain the model-reference inverse, even through the plant is subject to disturbances. Simulations demonstrate that a 100-tap FIR filter from the model-reference inverse can be used for canceling unwanted resonance modes in both the two-stage scheme and the combined scheme. In another embodiment, a linear model fitting method can further be used to convert the 100-tap FIR filter to a $6^{th}$ order IIR filter for implementation, and to eliminate or reduce model misadjustment from disturbances in the adaptive filtering. The IIR filter can be incorporated into the control system of a dual-actuator disc drive as a PZT compensator for approximating the ideal PZT system. A universal controller that is designed based upon the ideal PZT model can therefore be implemented into dual-stage disk drives without performance degradation.

The indirect adaptive filtering schemes disclosed herein circumvent the limitation that traditional adaptive filtering is only applicable to open-loop systems. These schemes extend the applications of adaptive filtering to modeling components in closed-loop systems without the interference of feedback signal. These schemes can be applied to identify and inverse any unknown component in a closed-loop system if dither signal injection directly into the unknown component is available.

A method of providing plant variation compensation for a microactuator 322 in a dual-stage servomechanism 300 of a disc drive 200 includes performing indirect adaptive filtering to identify plant variation in the microactuator 322, and tuning a compensator 408 for the microactuator 322 based on the plant variation.

In one embodiment of this method, indirect adaptive filtering is performed using a two-stage process, including a first stage 800 of adaptive modeling for the dual-stage servomechanism 300, and a second stage 900 of generating an indirect model-reference inverse $\hat{F}_3(z)$ for the microactuator 322. In another embodiment, indirect adaptive filtering is performed using a combined process 1000 that includes adaptive modeling 1018 for the dual-stage servomechanism 300, and simultaneously generating an indirect model-reference inverse $\hat{F}_3(z)$ for the microactuator 322. The indirect model-reference inverse $\hat{F}_3(z)$ generated by either of the embodiments can be used as the compensator for the microactuator 322. In one embodiment, the compensator is implemented as a finite impulse response (FIR) filter. Alternatively, the FIR filter is converted into an infinite impulse response (IIR) filter using a linear model fitting method. In one embodiment, the micro actuator 322 is a piezo electric micro actuator including a piezoelectric element which is made of a lead-zirconate-titanate material, thereby forming a PZT system, and the dual-stage servomechanism 300 includes a coarse actuator such as a voice coil motor (VCM) 302.

In accordance with another embodiment of the present invention, a dual-actuator disc drive 200 includes a base 202, a disc 228 rotatably attached to the base 202, a transducer 218 carried in a transducing relation with respect to the disc 228, a first-stage actuator 302 for providing coarse positioning of the transducer 218, a second-stage actuator 322 for providing fine positioning of the transducer 218, and a controller 344. Controller 344, coupled to the first-stage and second-stage actuators, monitors an actual position signal 346 for the transducer 218 and generates first and second control signals 348 and 350 for the first-stage and the second-stage actuator, respectively. The controller 344 includes a first control path 402, 404 for the first-stage actuator, and a second control path 406–410 for the second-stage actuator. The second control path includes a compensator 408 for approximating an ideal second-stage actuator. In one embodiment of this disc drive, the first-stage actuator 302 includes a VCM, and the second-stage actuator 322 includes a PZT system. In alternative embodiments, the compensator 408 includes an FIR filter or an IIR filter which is based on an indirect model-reference inverse for the second-stage actuator.

In accordance with another embodiment of the invention, a system for providing plant variation compensation for a piezoelectric microactuator 322 in a dual-stage servomechanism 300 of a disc drive 200 includes performing means and tuning means. The performing means is for performing indirect adaptive filtering to identify plant variation in the piezoelectric microactuator. The tuning means is for tuning a compensator for the microactuator based on the identified plant variation.

It is to be understood that the above description is intended to be illustrative, and not restrictive. Many other embodiments will be apparent to those of ordinary skill in the art upon reviewing the above description. The scope of the present invention should, therefore, be determined with reference to the appended claims, along with the full scope of equivalents to which such claims are entitled.

What is claimed is:

1. A method comprising steps of:
   (a) performing indirect adaptive filtering to identify plant variation in the microactuator; and (b) tuning a compensator for the microactuator based on the plant variation.

2. The method of claim 1 wherein step (a) includes (a)(i) performing two-stage indirect adaptive filtering.

3. The method of claim 2 wherein step (a)(i) includes (a)(i)(1) performing a first stage of adaptive modeling for the dual-stage servomechanism.

4. The method of claim 3 wherein step (a)(i) further includes (a)(i)(2) performing a second stage of generating an indirect model-reference inverse for the microactuator.

5. The method of claim 1 wherein step (a) includes (a)(ii) performing combined indirect adaptive filtering.

6. The method of claim 5 wherein step (a)(ii) includes (a)(ii)(1) performing adaptive modeling for the dual-stage servomechanism.

7. The method of claim 6 wherein step (a)(ii) further includes (a)(ii)(2) generating an indirect model-reference inverse for the microactuator.

8. The method of claim 7 wherein step (a)(ii)(1) and step (a)(ii)(2) are performed simultaneously.

9. The method of claim 1 wherein step (a) includes (a)(iii) generating an indirect model-reference inverse for the microactuator.

10. The method of claim 9 wherein step (h) includes (b)(i) using the indirect model-reference inverse for the microactuator as the compensator.

11. The method of claim 9 wherein step (a)(iii) includes (a)(iii)(I) generating a finite-impulse response (FIR) filter for the indirect model-reference inverse.

12. The method of claim 11 further comprising the step of (c) converting the FIR filter into an infinite impulse response (IIR) filter.

13. The method of claim 12 wherein step (c) includes (c)(i) applying linear model fitting to the FIR filter to convert the FIR filter into the IIR filter.

14. The method of claim 1 wherein the microactuator includes a piezoelectric element made of a lead-zirconate-titanate material, thereby forming a PZT system.

15. The method of claim 1 wherein the dual-stage servomechanism includes the microactuator and a coarse actuator which includes a voice coil motor (VCM).

16. An apparatus comprising:
   a first-stage actuator for providing coarse positioning of a transducer;
   a second-stage actuator for providing fine positioning of the transducer;
   a controller, coupled to the first-stage and the second-stage actuators, for monitoring an actual position signal for the transducer and for generating a first and a second control signal for the first-stage and the second-stage actuator, respectively, wherein the controller includes a first and a second control path for the first-stage and the second-stage actuator, respectively, and the second control path includes a second-stage actuator compensator for approximating an ideal second-stage actuator.

17. The apparatus of claim 16 wherein the first-stage actuator comprises a VCM, and the second-stage actuator comprises a PZT system.

18. The apparatus of claim 16, wherein the compensator includes an FIR filter that is based on an indirect model-reference inverse for the second-stage actuator.

19. The apparatus of claim 16, wherein the compensator includes an IIR filter that is based on an indirect model-reference inverse for the second-stage actuator.

20. A system for providing plant variation compensation for a piezoelectric microactuator in a dual-stage servomechanism of a disc drive, comprising:
   (a) means for performing indirect adaptive filtering to identify plant variation in the piezoelectric microactuator; and
   (b) means for tuning a compensator for the piezoelectric microactuator based on the plant variation.

* * * * *